(12) United States Patent
Fujino et al.

(10) Patent No.: US 11,269,701 B2
(45) Date of Patent: Mar. 8, 2022

(54) DEVICE CONTROL APPARATUS, DEVICE CONTROL METHOD, AND DEVICE CONTROL SYSTEM

(71) Applicant: NIPPON TELEGRAPH AND TELEPHONE CORPORATION, Tokyo (JP)

(72) Inventors: Tomoyuki Fujino, Musashino (JP); Keiichiro Kashiwagi, Musashino (JP); Hisaharu Ishii, Musashino (JP); Yui Saito, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/048,160

(22) PCT Filed: Apr. 16, 2019

(86) PCT No.: PCT/JP2019/016291
§ 371 (c)(1),
(2) Date: Oct. 16, 2020

(87) PCT Pub. No.: WO2019/203221
PCT Pub. Date: Oct. 24, 2019

(65) Prior Publication Data
US 2021/0165701 A1    Jun. 3, 2021

(30) Foreign Application Priority Data
Apr. 17, 2018 (JP) .............................. JP2018-079174

(51) Int. Cl.
*G06F 9/54*     (2006.01)
*H04L 67/125*   (2022.01)

(52) U.S. Cl.
CPC ............ *G06F 9/547* (2013.01); *H04L 67/125* (2013.01)

(58) Field of Classification Search
CPC ......... G06F 9/547; G06F 9/548; H04L 29/06; H04L 29/08072
(Continued)

(56) References Cited

U.S. PATENT DOCUMENTS 10,691,832 B2\*  6/2020  Wakai ........................ H04L 9/08
2014/0025744 A1\* 1/2014  Kim ....................... G06F 3/1454
                                                    709/204
(Continued)

FOREIGN PATENT DOCUMENTS

EP    1445972 A1    8/2004
EP    2579608 A1    4/2013
(Continued)

OTHER PUBLICATIONS

Toshihiko Kato and Masahiko Fujinaga, "RPC Protocol Conversion for Interconnection of Distributed Systems", Zenkoku Taikai Kouen Ronbunshuu, Network (1991): 125-126.
(Continued)

*Primary Examiner* — Andy Ho
(74) *Attorney, Agent, or Firm* — Harness, Dickey & Pierce, P.L.C.

(57) ABSTRACT

Provided are a device control apparatus, a device control method, and a device control system which prevent a conflict from occurring in RPCs simultaneously transmitted from a plurality of applications to the same device, so that RPCs can be applied to exercise control over devices in an IoT system of a many-to-many connection which cannot accept non-completion of a series of processing operations in cooperation. The device control apparatus includes a memory (13h) in which information on a device (30) and an
(Continued)

identifier of the device (30) is stored, and a memory (13*i*) in which authority of the device 30 for each application (20) is stored. The device control apparatus includes a memory (13*h*) configured to store information on a device (30) and an identifier of the device (30), and a memory (13*i*) configured to store authority for controlling the device 30 for each application (20). The apparatus, the method, and the system provide, in accordance with a request signal from, e.g., an application (20*a*) control authority to the application (20*a*), if the application (20*a*) has control authority for all devices (30) as a control object, and transmit a remote control signal from the application (20*a*) to devices (30*a*, 30*b*) as a control object while excluding a control authority for other applications (20*b*, 20*c*) to control the devices (30).

7 Claims, 15 Drawing Sheets

(58) Field of Classification Search
USPC .................................. 709/208, 210; 719/330
See application file for complete search history.

(56) References Cited

U.S. PATENT DOCUMENTS

| | | | |
|---|---|---|---|
| 2017/0063824 A1* | 3/2017 | Li | .......................... H04W 12/06 |
| 2017/0351231 A1* | 12/2017 | Maeshima | .......... H04L 12/2816 |

FOREIGN PATENT DOCUMENTS

| | | |
|---|---|---|
| JP | 2003023676 A | 1/2003 |
| JP | 2003116181 A | 4/2003 |
| JP | 2016134757 A | 7/2016 |
| WO | WO-2017169144 A1 | 10/2017 |

OTHER PUBLICATIONS

International Search Report (English and Japanese) issued in PCT/JP2019/016291, dated Jul. 16, 2019; ISA/JP.

* cited by examiner

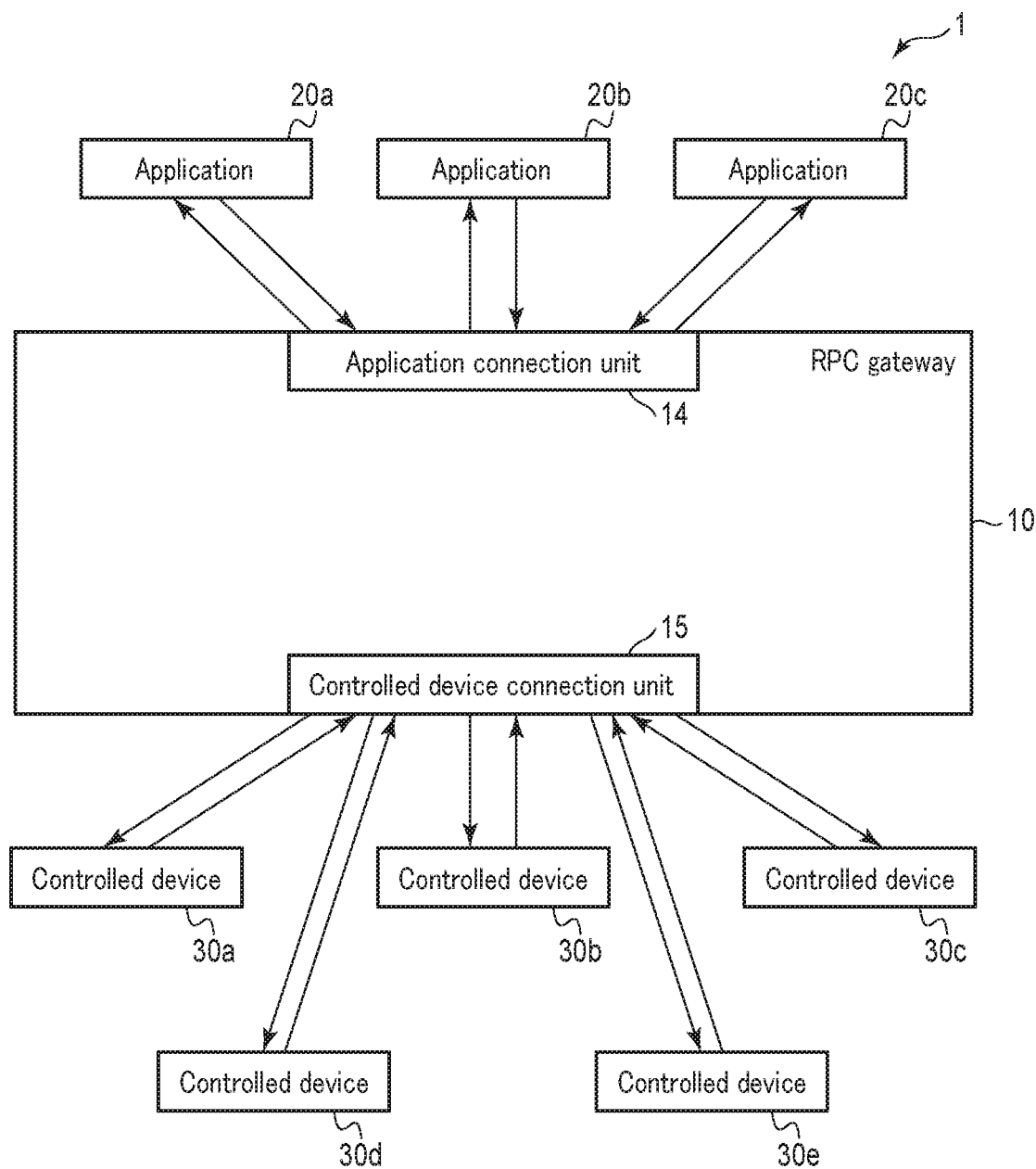
F I G. 1

| Controlled device | Identifier |
|---|---|
| 30a | device001 |
| 30b | device002 |
| 30c | device003 |
| 30d | device004 |
| 30e | device005 |

FIG. 3

| Controlled device | Application that possesses control authority |
|---|---|
| device001 | |
| device002 | |
| device003 | |
| device004 | |
| device005 | |

FIG. 4A

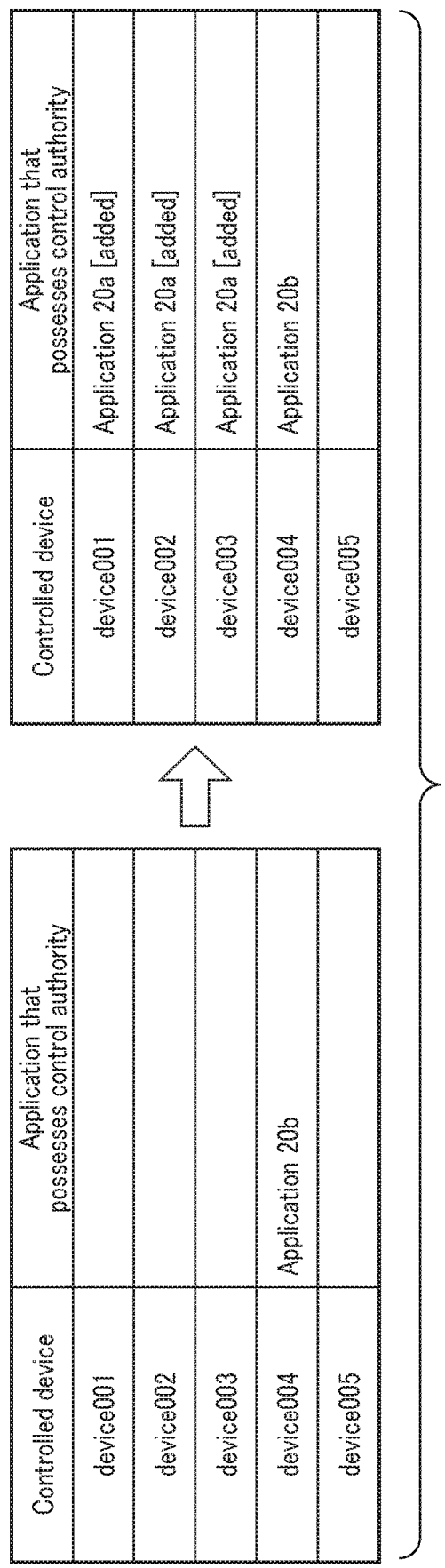
F I G. 4B

| Controlled device | Application that possesses control authority |
|---|---|
| device001 | Application 20a |
| device002 | Application 20a |
| device003 | Application 20a |
| device004 | Application 20b |
| device005 | |

FIG. 4D

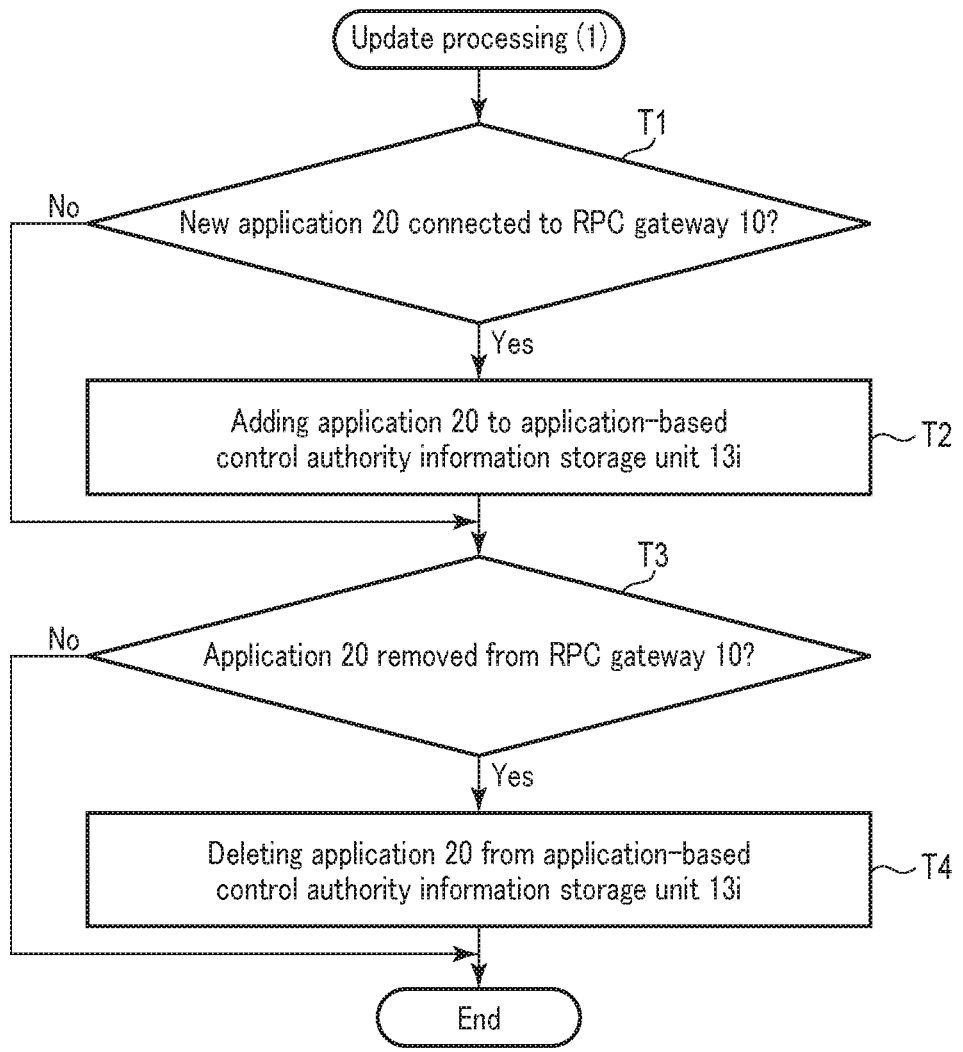
F I G. 6A

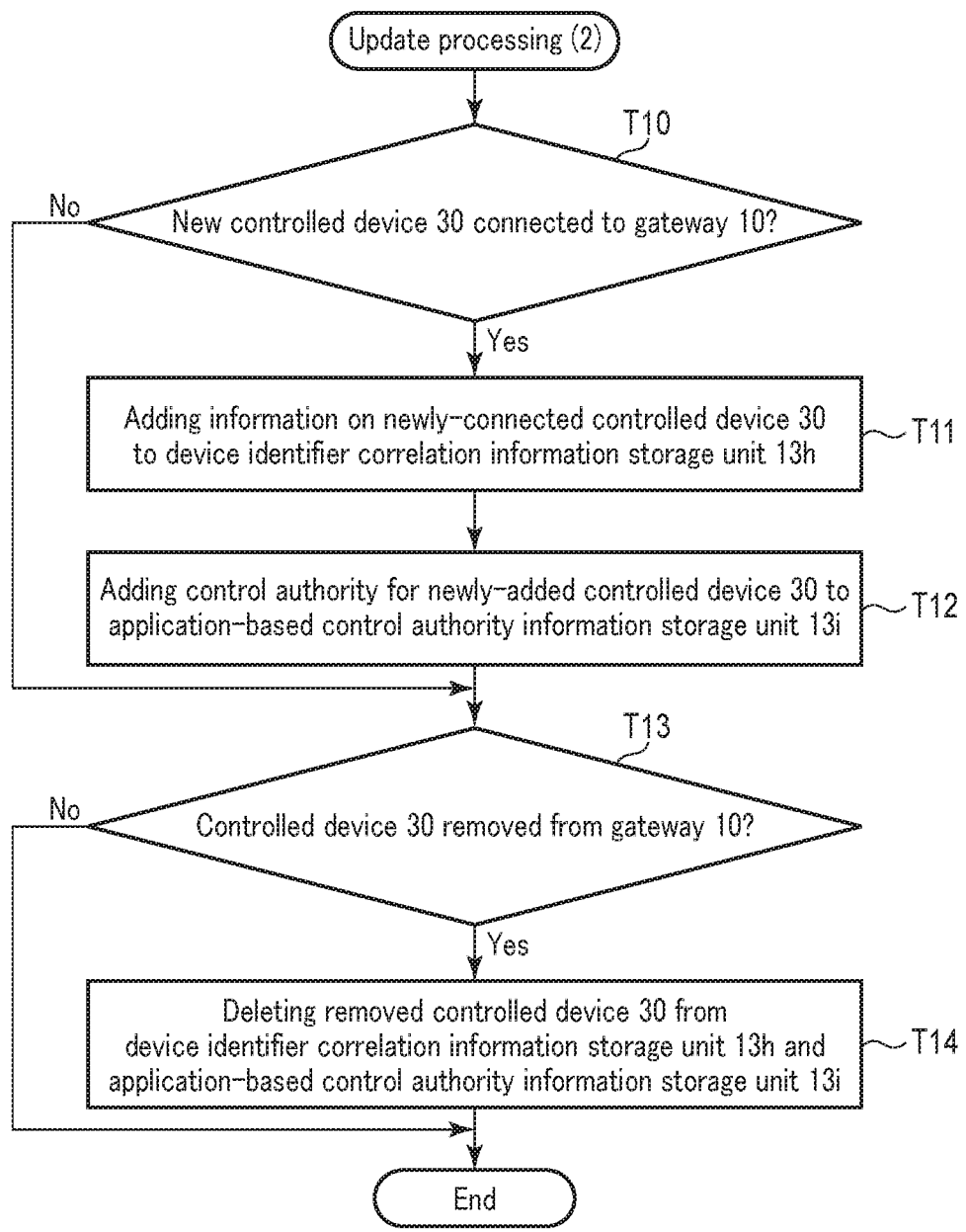
F I G. 6B

DEVICE CONTROL APPARATUS, DEVICE CONTROL METHOD, AND DEVICE CONTROL SYSTEM

CROSS-REFERENCE TO RELATED APPLICATIONS

This is a U.S. national phase application under 35 USC 371 of international application PCT/JP2019/016291, filed on Apr. 16, 2019, which claims priority to Japanese patent application No. 2018-079174, filed on Apr. 17, 2018. The entire disclosures of the above applications are incorporated herein by reference.

FIELD

The present invention relates to a device control apparatus, a device control method, and a device control system.

BACKGROUND OF THE INVENTION

In an Internet of Things (IoT) system used in recent years, a device mounted with various sensors or actuators is connected to a network, and data from this device is collected and utilized.

In some cases, a plurality of applications (such as an apparatus, software, or process) are connected to this IoT system and control operation of the aforementioned device through transmission of control signals thereto.

As a specific control technique using the control signals, a Remote Procedure Call (hereinafter referred to as "RPC") has been used (see Non Patent Literature 1).

CITATION LIST

Non Patent Literature 1

Toshihiko Kato and Masahiko Fujinaga, "RPC Protocol Conversion for Interconnection of Distributed Systems", Zenkoku Taikai Kouen Ronbunshuu, Network (1991): 125-126

SUMMARY

Technical Problem

With a single application, a device can be operated using the RPC without trouble.

However, in an IoT system provided with a plurality of applications, when one application and another application control the same device without cooperation (conjunction), this device receives a plurality of RPCs simultaneously or continuously from these applications. This may result in a conflict between multiple controls.

Herein, a conflict indicates that a plurality of applications are authorized to control operation of the same device.

In such a case, the entire processing should be completed by executing a series of processing operations in response to an RPC from one application, and then executing a series of processing operations in response to an RPC from another application. However, the aforementioned conflict may cause part of the device to perform processing of a different kind, thereby giving rise to a problem that a desired series of processing operations cannot be achieved as a whole.

If a device subjected to remote control is configured to perform data processing and a problem occurs in the data processing, initialization is only required by cancelling data obtained as a result of the data processing.

For example, for the update processing for a plurality of data items in a database, a series of processing operations is handled as a transaction. If processing fails halfway, data can be initialized by performing rollback processing.

However, for example, if the controlling of a controlled device for industrial use fails, certain situations forbid the cancellation and re-execution of processing which has already been executed once (for example, irreversible processing), such as in rollback processing.

A specific example of such a situation is a case in which a device executes processing that involves material deformation, denaturation, etc., depending on the device. In such a case, once processing fails halfway, the initialization is no longer possible.

For this reason, the completion of a series of processing operations which cannot be rolled back requires a mechanism for preventing a conflict between remote controls even when a plurality of applications remotely control a plurality of devices via a network, and for reliably completing each series of processing operations designated by each application.

If an application that transmits a fraudulent RPC not expected by the IoT system is involved in control over devices via a network, the devices may be operated fraudulently.

If a device is controlled fraudulently, a delay may occur in the processing for another application that controls the fraudulently-controlled device, or the device may be damaged or the like.

Under these circumstances, a mechanism for preventing a fraudulent RPC from being transmitted to devices is necessary.

The present invention has been made in view of the above problems, and aims to provide a device control apparatus, a device control method, and a device control system, which prevent a conflict from occurring in RPCs simultaneously transmitted from a plurality of applications to the same device, so that RPCs can be applied to exercise control over devices in an IoT system of a many-to-many connection which cannot accept non-completion of a series of processing operations in cooperation.

Solution to Problem

A device control apparatus according to an aspect of the present invention includes an application-based control authority information storage unit configured to store application-based control authority information that a plurality of applications configured to remotely control operation of a plurality of controlled devices on a group-by-group basis are correlated with whether or not the applications possess control authority for remote control with respect to each controlled device, a control authority determining means configured to, upon receipt, from a first application included in the applications, of a request signal for requesting control authority with respect to the controlled devices, determine, based on the application-based control authority information, whether or not any application other than the first application has obtained control authority for remote control with respect to each controlled device, a control authority providing means configured to provide the first application with control authority with respect to the controlled devices if the control authority determining means determines that no application other than the first application has obtained control authority for remote control with respect to each controlled device, a control authority forbidding means configured to forbid provision of control authority with respect to the controlled devices to the applications other than the first application if the control authority providing means provides the first application with the control authority; and a transferring means configured to, if a remote control signal directed to the controlled devices is transmitted from the first application provided with the control authority, transfer the remote control signal to the controlled devices.

Advantageous Effects of Invention

According to the present invention, a conflict can be prevented from occurring in RPCs simultaneously transmitted from a plurality of applications to the same device, so that RPCs become applicable to exercise control over devices in an IoT system of a many-to-many connection which cannot accept non-completion of a series of processing operations in cooperation.

BRIEF DESCRIPTION OF THE DRAWINGS

FIG. 1 is a block diagram showing a configuration of a device control system 1 including an RPC gateway 10 according to an embodiment.

FIG. 3 is a view showing identifiers for respective controlled devices 30 (30a to 30e) stored in a device identifier correlation information storage unit 13h within a storage device 13 of the RPC gateway 10.

FIG. 4A is a conceptual view of a control authority management storage unit 13i provided inside the storage device 13 of the RPC gateway 10.

FIG. 4B is a view showing a control authority possessing state by an application 20 with respect to each controlled device 30, which is stored in the control authority management storage unit 13i within the storage device 13 of the RPC gateway 10.

FIG. 4D is a view showing which application 20 can remotely control controlled devices 30 connected to the RPC gateway 10.

FIG. 6A is a flowchart showing update processing (1) of the RPC gateway 10.

FIG. 6B is a flowchart showing update processing (2) of the RPC gateway 10.

DETAILED DESCRIPTION

Figure 2:
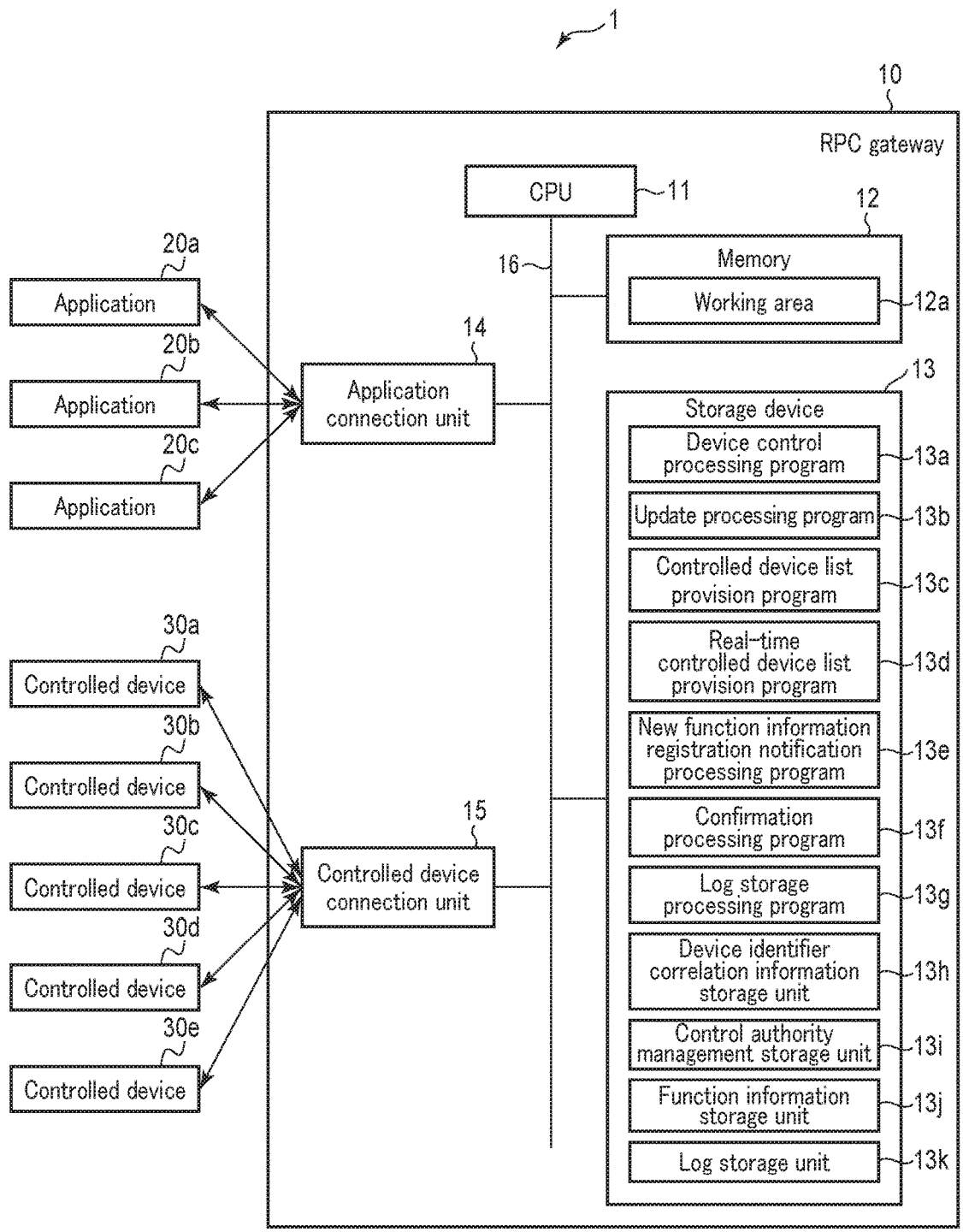
FIG. 2 is a block diagram showing a circuit configuration of the RPC gateway 10 included in the device control system 1.

Hereinafter, a device control apparatus, a device control method, and a device control system according to embodiments of the present invention will be described with reference to the drawings.

FIG. 1 is a block diagram showing a configuration of a device control system 1 including an RPC gateway 10 as a device control apparatus according to an embodiment.

The device control system 1 includes the RPC gateway 10, applications 20 (20a to 20c), and controlled devices 30 (30a to 30e).

Each application 20 (20a to 20c) is realized by a device provided with a CPU executing a program stored in a storage medium. Hereinafter, the description will be given based on the assumption that the applications 20 (20a to 20c) each shown as a block figure in the drawings represent a device configured to execute each application 20 (20a to 20c). However, the drawings illustrate only one example. Each application 20 may not necessarily be arranged on each separate device. The plurality of applications may be arranged on a single device and executed thereby. In FIG. 1, the applications 20 (20a to 20c) (i.e., devices configured to execute applications) is connected to the RPC gateway 10 via an application connection unit 14.

The controlled devices 30 (30a to 30e) are connected to the RPC gateway 10 via a controlled device connection unit 15.

Hereinafter, the applications 20a to 20c will be simply referred to as "the application 20" or "applications 20" when not distinguished from each other. Similarly, the controlled devices 30a to 30e will be simply referred to as "the controlled device 30" or "controlled devices 30" when not distinguished from each other.

The application 20 transmits RPC signals to the RPC gateway 10.

The RPC signals include an RPC application signal, an RPC execution request (remote control) signal, and an RPC control authority release signal.

The RPC application signal is a signal for obtaining (getting) an authority (hereinafter, referred to as a control authority) to exclusively control operation of the controlled device 30.

The RPC execution request signal is a signal transmitted from the application 20 given the control authority, and remotely controls operation of the plurality of controlled devices 30 (30a to 30e).

The RPC control authority release request signal is a signal for releasing the control authority which has been obtained so far. This RPC control authority release request signal is transmitted from the application 20 to the RPC gateway 10 after execution of remote control over the controlled device 30.

As described above, each application 20 or each device 20 configured to execute each application includes: a requesting means (requesting unit) for outputting an RPC application signal for requesting control authority with respect to the controlled devices 30 (30a to 30e); a means (transmitting unit) for transmitting to the RPC gateway 10 an RPC execution request signal (remote control signal) for remotely controlling the controlled device 30 when the control authority with respect to this particular controlled device 30 is obtained by using the requesting means; and a means (transmitting unit) for transmitting an RPC control authority release request signal to the RPC gateway 10. Furthermore, the application 20 receives from the RPC gateway 10 an execution result of the controlled device 30 operated based on the RPC remote control signal (in FIG. 1, see the arrows directed from the RCP gateway 10 to the respective applications 20).

A format for the RPC application signal and the RPC control authority release request signal contains the description of a self (application 20's own) address or identifier and an identifier of a transmission destination (the controlled device 30 (30a to 30e) as a control object)).

A format for the RPC execution request signal contains in addition to a self (application 20's own) address or identifier and an identifier of a transmission destination (the controlled device 30 (30a to 30e) as a control object)) a control content with respect to the controlled device 30 (function information for operation control ([function name] and argument [including data]).

The RPC gateway 10 has a relay function in such a manner as to prevent a conflict in remote controls of the applications 20 with respect to the controlled device 30.

Specifically, the RPC gateway 10 includes:

(1) a function that provides an application 20 with a control authority to remotely control a controlled device 30 when the application 20 satisfies a predetermined condition (no conflict with another application 20), and transmits via the RPC gateway 10 itself the RPC remote control signal received from the application provided with the control authority to the controlled device 30 (30a to 30e);

(2) an updating function that grasps in real time applications 20 and controlled devices 30 which are connected to the RPC gateway 10;

(3) a controlled device list provision function that provides, in reply to an inquiry from an application, a list of controlled devices 30 for which any application 20 has not obtained a control authority.

(4) a real-time controlled device list provision function that provides, in reply to an application 20, a list of controlled devices 30 for which this particular application 20 is currently possessing a control authority.

(5) a new function information registration notification function that, when a controlled device 30 that operates based on new function information (function name and argument [including data]) is connected to the RPC gateway 10, registers this particular controlled device 30 and function information necessary for controlling the controlled device 30, and notifying this information to the application 20;

(6) a function information matching function/result confirmation function that checks whether or not the function information described in an RPC remote control signal from an application 20 contains an error, and whether or not a result from a controlled device 30 operated in accordance with this RPC remote control signal contains an error; and (7) a log record function that records the entire operation of the RPC gateway 10 in a log.

The controlled device 30 includes a processor and a memory connected to the processor. Upon receipt of the RPC remote control signal relayed by the RPC gateway 10, in response to a command stored in the memory, the processor executes a predetermined control in accordance with the received RPC remote control signal. The controlled device 30 has a function of transmitting a result of this execution (for example, success: True, failure: False, information on any of "data strings" indicative of a result content) to the RPC gateway 10.

FIG. 2 is a block diagram showing a circuit configuration of the RPC gateway 10 included in the device control system 1.

FIG. 3 is view showing identifiers for the respective controlled devices 30 (30a to 30e) stored in a device identifier correlation information storage unit 13h within a storage device 13 of the RPC gateway.

FIGS. 4A to 4D include a conceptual view of a control authority management storage unit 13i that is provided inside the storage device 13 of the RPC gateway 10 and functions as an application-based control authority information storage unit and a controlled device information storage unit, and a view showing a control authority possessing state of the applications 20 (20a to 20c) with respect to the controlled devices 30 (30a to 30e), which is stored in the control authority management storage unit 13i and is changed over time.

The RPC gateway 10 includes a CPU 11 as a control unit.

The CPU 11 is connected to a memory 12, a storage device 13, an application connection unit 14, and a controlled device connection unit 15 via a system bus 16.

The memory 12 includes a working area 12a.

The storage device 13 is formed of a hard disk, a flash memory, etc., and includes a device control processing program 13a, an update processing program 13b, a controlled device list provision program 13c, a real-time controlled device list provision program 13d, a new function information registration notification processing program 13e, a confirmation processing program 13f, and a log storage processing program 13g. Furthermore, the storage device 13 includes a device identifier correlation information storage unit 13h, a control authority management storage unit 13i, a function information storage unit 13j, and a log storage unit 13k.

Each device control processing program 13a to the log storage processing program 13g is activated and executed by the CPU 11 using the working area 12a. In accordance with control signals from the CPU 11 based on the device control processing program 13a to the log storage processing program 13g, respective units of the circuit are controlled. In this manner, device control processing, update processing (1), update processing (2), controlled device list provision processing, real-time controlled device list provision processing, new function information registration notification processing, confirmation processing, and log storage processing, which will be described later, are realized.

The device identifier correlation information storage unit 13h stores controlled devices 30 (30a to 30e) and identifiers corresponding to the controlled devices 30 (30a to 30e).

As shown in FIG. 3, identifiers of the controlled devices 30a, 30b, 30c, 30d, and 30e are respectively set to "device001", "device002", "device003", "device004", and "device005".

The control authority management storage unit 13i, which functions as the application-based control authority information storage unit and the controlled device information storage unit, stores a control authority possessing state of each application 20 (20a to 20c) with respect to the controlled devices 30 (30a to 30e) (see FIGS. 4A to 4D).

First, as shown in FIG. 4A, the control authority management storage unit 13i stores the controlled devices 30 (30a to 30e) in such a manner that they are respectively correlated with the applications 20 (20a to 20c) having a control authority with respect to these controlled devices 30.

FIG. 4A shows the initial state in which no application 20 (20a to 20c) has obtained a control authority with respect to the controlled devices 30 (30a to 30e).

FIG. 4B shows the example in which the application 20a obtains a control authority with respect to the controlled devices 30 (30a to 30c).

FIG. 4B assumes that the application 20b possesses a control authority with respect to the controlled device 30d.

That is, the application 20a can obtain a control authority with respect to the controlled devices 30 (30a to 30c) because no application 20 possesses a control authority with respect to them.

Figure 4C:
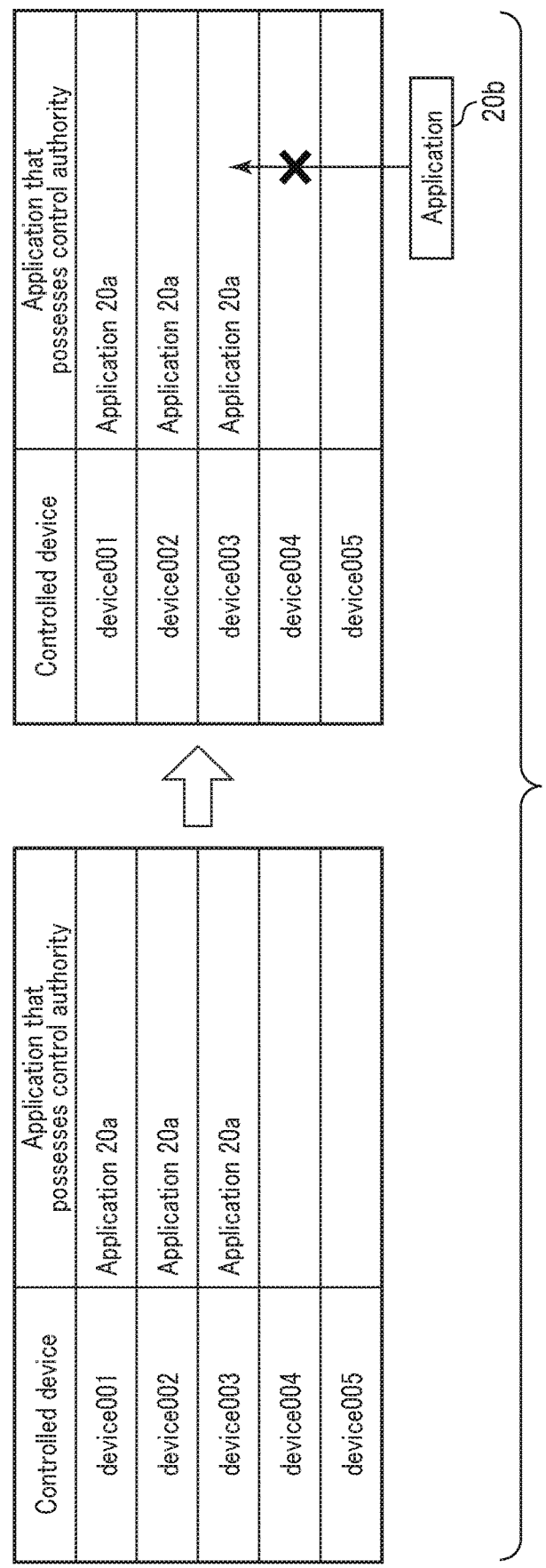
FIG. 4C is a view showing a state of rejecting a request for obtaining control authority from application 20b with respect to a controlled device 30c connected to the RPC gateway 10.

However, as shown in FIG. 4C, if the application 20a possesses a control authority with respect to the controlled devices 30 (30a to 30c), a request from, e.g., the application 20b, for obtaining a control authority with respect to the controlled device 30c is rejected. That is, the application 20b cannot be added to the portion indicated by the arrow.

Accordingly, the application 20b can neither obtain a control authority for the controlled device 30c nor for the controlled devices 30d and 30e.

In this manner, a control authority possessing state for each controlled device 30 (30a to 30e), indicating which application 20 possesses a control authority can be grasped at a predetermined time (for example, a time when a remote control over the controlled device 30 is desired) by referring to the control authority management storage unit 13i. Furthermore, whether or not an application 20 can obtain a control authority constantly changes in relation to the other applications 20.

For example, assume that a control authority possessing state shown in FIG. 4D is realized at a predetermined time. As shown in FIG. 4D, at the predetermined time, the application 20a possesses a control authority with respect to the controlled devices 30 (30a to 30c), and the application 20b possesses a control authority with respect to the controlled device 30d.

That is, according to FIG. 4D, the application 20a can remotely control operation of the controlled devices 30 (30a to 30c) and the application 20b can remotely control the controlled device 30d until the control authorities are released.

However, with respect to the combinations other the above, the RPC gateway 10 returns an error to an application 20 that has transmitted a remote control signal.

The control authority management storage unit 13i may store information on the applications 20 that are currently connected to the RPC gateway 10.

The function information storage unit 13j stores function information for each controlled device 30.

As the function information, [a function name indicative of an operation content of a controlled device 30 (for example, "move" processing), an argument [including data] (for example, x, y, z: "1", "1", "1")] and a data type of an execution result of the controlled device 30 to be received (success: True, failure: False, a data string, etc.) are stored.

In accordance with the control signal, the application connection unit 14 receives from and transmits to the applications 20 (20a to 20c) an RPC signal and an execution result (True, False, or a data string).

In accordance with the control signal, the controlled device connection unit 15 receives from the controlled devices 30 (30a to 30e) an RPC signal and an execution result (True, False, or a data string).

The RPC gateway 10 thus configured realizes processing explained in the following description about the operation, by the CPU 11 exercising control over operation of the respective units of the circuit in accordance with commands described in connection with the device control processing program 13a to the log storage processing program 13g, and by a software and a hardware operating in cooperation with each other. Next, operation of the device control system 1 thus configured will be described.

[Device Control Processing]

Figure 5A:
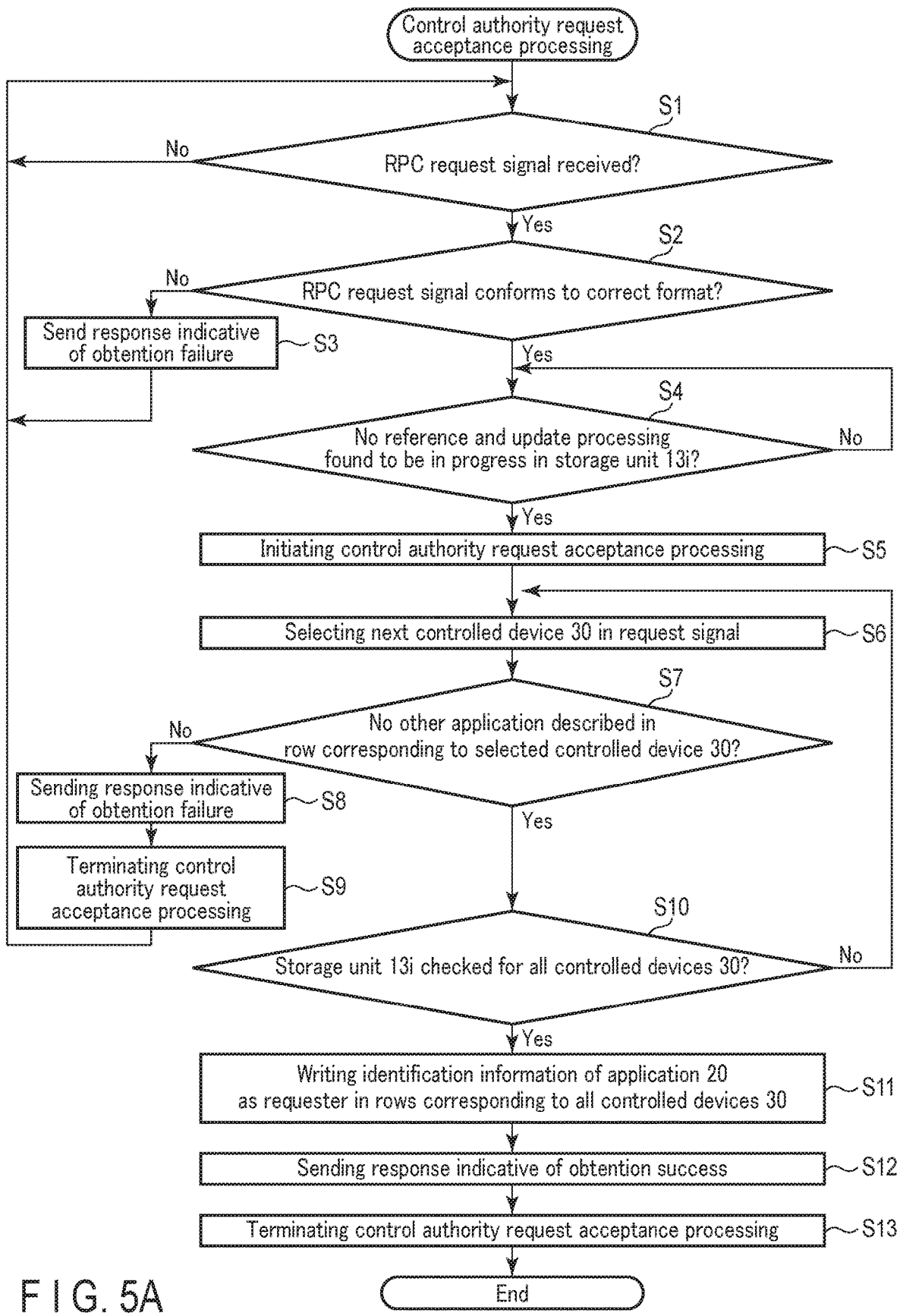
FIG. 5A is a flowchart showing device control processing (control authority request acceptance processing) of the RPC gateway 10.
Figure 5B:
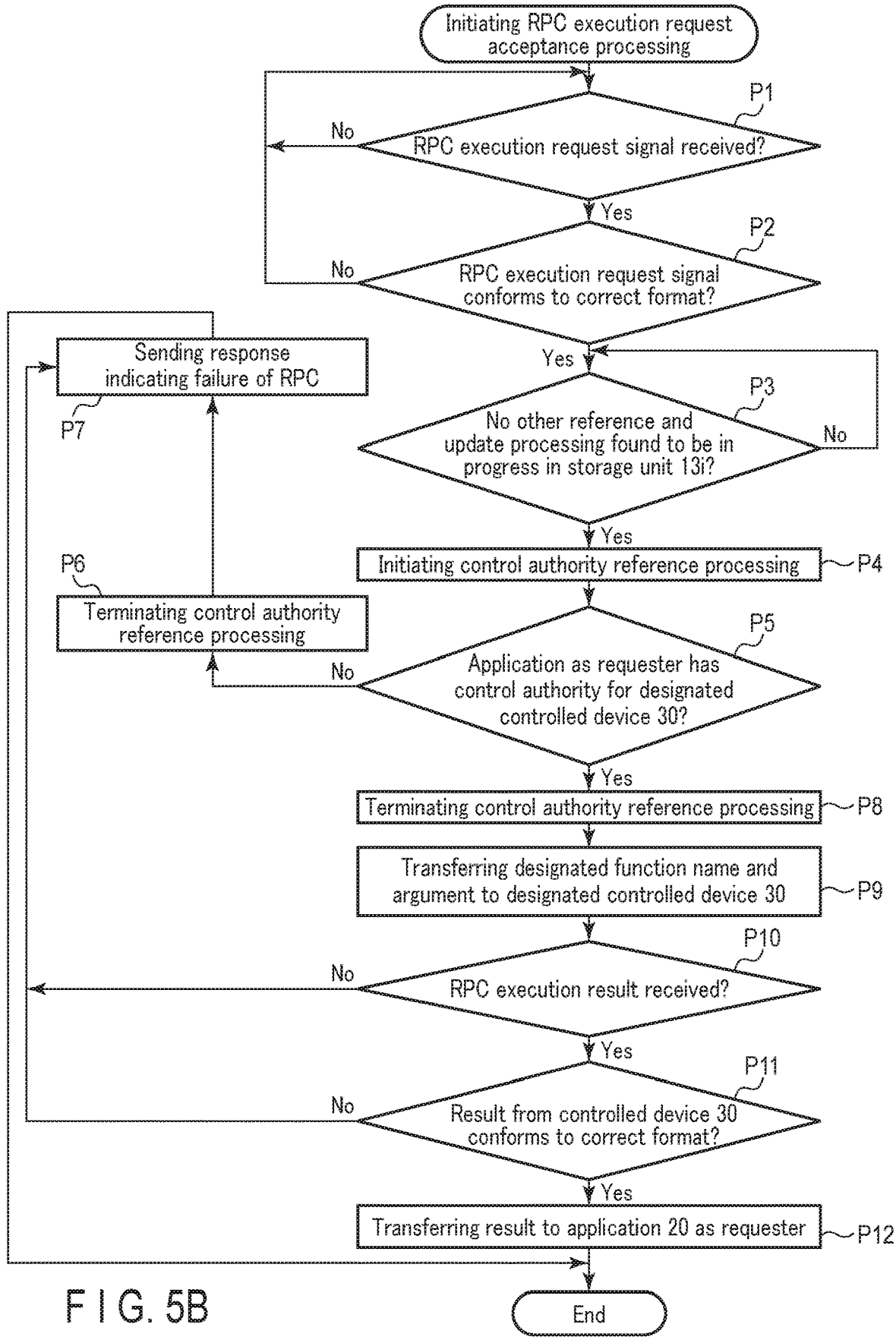
FIG. 5B is a flowchart showing device control processing (RPC execution request acceptance processing) of the RPC gateway 10.
Figure 5C:
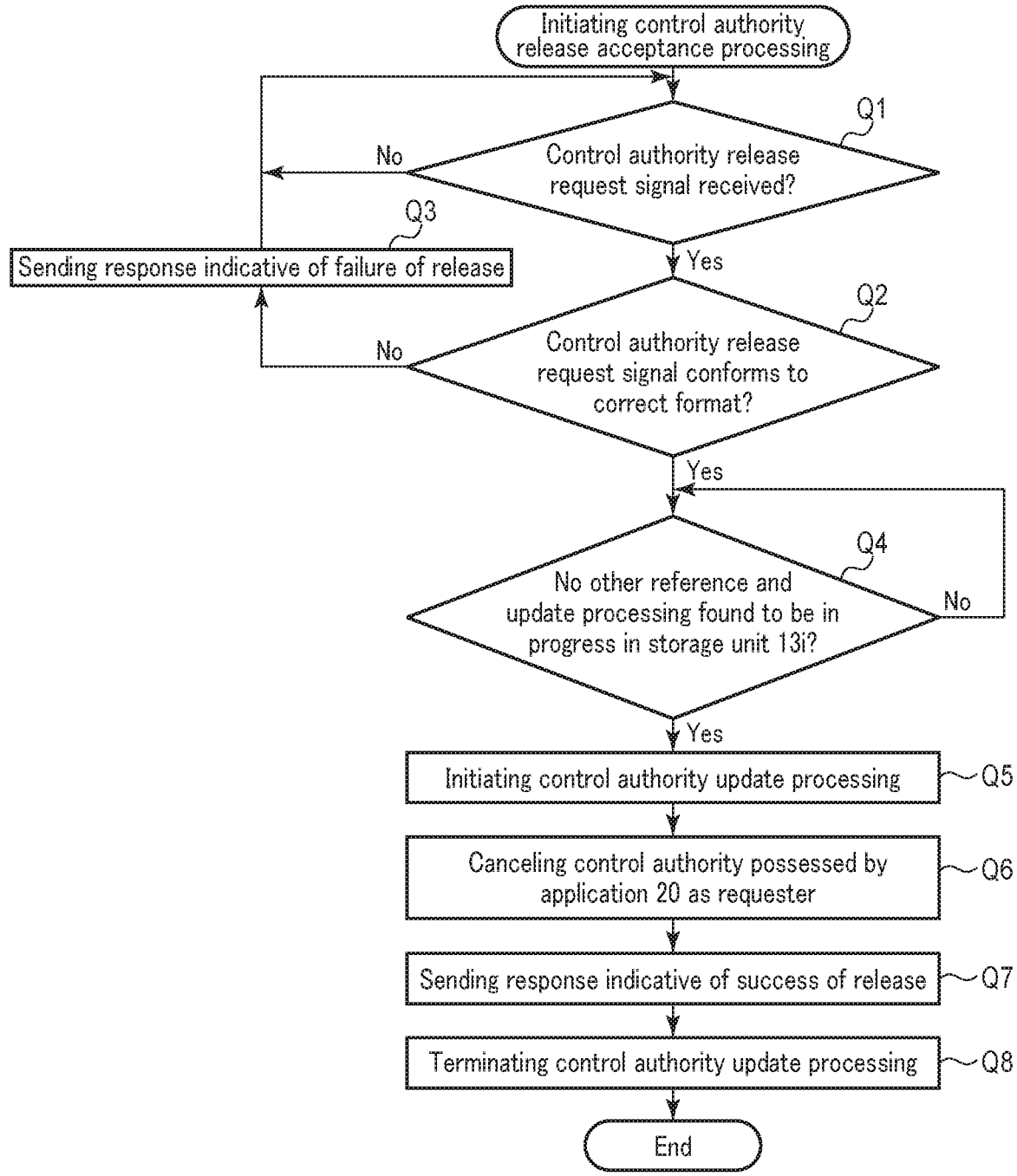
FIG. 5C is a flowchart showing device control processing (control authority release acceptance processing) of the RPC gateway 10.

FIGS. 5A, 5B, and 5C are each a flowchart showing device control processing for the RPC gateway 10. The device control processing described below is roughly divided into (1) control authority request acceptance processing, (2) RPC remote signal acceptance processing, and (3) control authority release processing.

In order to facilitate understanding, as an example, the processing will be described below by focusing on the device control processing (control authority request acceptance processing (FIG. 5A)), RPC remote signal acceptance processing (FIG. 5B), and control authority release acceptance processing (FIG. 5C) of the application 20a.

First, (1) control authority request acceptance processing will be described with reference to FIG. 5A.

(1) Control Authority Request Acceptance processing

When providing an application 20 with a control authority to exclusively control operation of a controlled device 30, the RPC gateway 10 is driven to activate a drive control processing program 13a. Then the CPU 11 of the RPC gateway 10 determines whether or not an RPC application signal has been received from the application 20 via the application connection unit 14 (step S1).

For example, if it is determined that an RPC application signal has been received from the application 20a (step S1, YES), the RPC gateway 10 then confirms whether or not a format of the RPC application signal from the application 20a that is a requester is correct (step S2). If a format of the RPC application signal is correct (step S2, YES), the RPC gateway 10 subsequently determines whether or not processing for rewriting (reference and update processing in the drawings) the control authority management storage unit 13i based on an RPC application signal from the other applications 20 (20b, 20c) is performed (step S4). That is, the RPC gateway 10 determines the presence or absence of the processing for rewriting a control authority by an RPC application signal from any of the other applications 20 (20b, 20c) (step S4).

If it is determined that the reference and update processing for a control authority is not performed (step S4, YES), the RPC gateway 10 initiates the following processing for requesting a control authority based on an RPC application signal from the application 20a (step S5).

First, the RPC gateway 10 selects a first controlled device 30 (for example, 30a) from the controlled devices 30 that are control objects and included in the RPC application signal (step S6).

Specifically, the RPC gateway 10 sets "1" to n using the working area 12a. Herein, n presents the number of controlled devices 30 that are set to control objects and described in the RPC application signal.

For example, n=3 where the application 20a sets the controlled devices 30 (30a, 30b, and 30c) to devices to be remotely controlled.

Subsequently, using the CPU 11 as a control authority determining means (connection-confirming means and authorization-determining means), the RPC gateway 10 confirms based on the control authority management storage unit 13*i*, whether or not the other applications 20 (20*b*, 20*c*) have a control authority with respect to the controlled device 30*a* designated by the application 20*a*, in other words, whether or not any of the other applications 20 (any of the applications 20*b* and 20*c*) is stored in the column for an application 20 correlated with the controlled device 30*a* shown in FIG. 4A, for example (step S7).

If no other application 20 (20*b*, 20*c*) possesses a control authority with respect to the controlled device 30*a* (step S7, YES, see the left side of FIG. 4B), the RPC gateway 10 then confirms whether or not the processing in step S7 has been performed on all controlled devices (30*a*, 30*b*, and 30*c*) included in the RPC application signal (step S10).

If the processing in step S7 has not been completed on all controlled devices (30*a*, 30*b*, and 30*c*) that are set to control objects (step S10 (NO)), the RPC gateway 10 assigns "n+1" to n, selects the controlled device 30*b* designated as a second controlled device 30, and then executes the processing in step S7 (step S10 (NO)→step S6→step S7).

The CPU 11 executes similar processing on the controlled device 30*c* designated as a third controlled device (step S10 (NO)→step S6→step S7).

As a result of the completion of processing in step S7 on all controlled devices 30 (30*a*, 30*b*, and 30*c*) set to control objects, if it is determined that no application 20 (20*b*, 20*c*) possesses a control authority (see the left side of FIG. 4B), so that a control authority with respect to all the controlled devices 30 (30*a*, 30*b*, and 30*c*) is available (step S10, YES), the RPC gateway 10 writes and stores information (such as an identifier) on the application 20*a* that is a requester as an application 20 that controls the controlled devices 30 (30*a*, 30*b*, and 30*c*) in the control authority management storage unit 13*i* by using the CPU 11 as a control authority determining means (step S11, see the right side of FIG. 4B).

Thereafter, the RPC gateway 10 sends the application 20*a* that is a requester a response indicating that a control authority to remotely control operation of the controlled devices 30 (30*a*, 30*b*, and 30*c*) has been provided (step S12), and excludes the other applications 20 (20*b*, 20*c*) from the control authority to control the controlled devices 30 (30*a*, 30*b*, and 30*c*) (or forbids granting of a control authority) by using the CPU 11 as a control authority forbidding means (that is, blocks a request from the other applications 20 (20*b*, 20*c*) for obtaining a control authority with respect to the controlled devices 30 (30*a*, 30*b*, and 30*c*). In this condition, the RPC gateway 10 terminates the update processing for the control authority management storage unit 13*i* (step S13), thereby shifting to the next processing, (2) RCP execution request acceptance processing.

If an RPC application signal is not received in step S1 (step S1, NO), the RPC gateway 10 waits until receipt of the RPC application signal. If an RPC request in a transmitted RPC application signal is not in a correct format (step S2, NO), the RPC gateway 10 sends the application 20*a* that is a requester a response indicating that obtention of a control authority has failed (step S3), and shifts to the processing for receiving a new RPC application signal (step S1). If request processing for a control authority from another application 20 is being processed when an RPC application signal is received (step S4, NO), the RPC gateway 10 waits until this request processing for a control authority is completed. If another application 20 possesses a control authority with respect to any of the controlled devices 30 (30*a*, 30*b*, and 30*c*) designated by the application 20*a* (step S7, NO, refer to FIG. 4C as one example), the RPC gateway 10 sends the application 20*a* that is a requester, using the CPU 11 as an error processing means, a response indicating that obtention of a control authority has failed (step S8) because the application 20*a* cannot excessively control the controlled devices 30 designated the application 20*a*. The RPC gateway 10 then terminates this processing (control authority request processing) (step S9) and shifts to the processing for receiving a new RPC application signal (step S1).

(2) RCP Execution Request Acceptance Processing

As shown in FIG. 5B, upon receipt of an RPC execution request signal from the application 20*a* provided with a control authority (step P1, YES), the RPC gateway 10 confirms whether or not a format of the RPC execution request signal from the application 20*a* that is a requester is correct (step P2). If the format is correct (step P2, YES), the RPC gateway 10 determines whether or not the processing for rewriting (reference and update processing in FIG. 5B) the control authority management storage unit 13*i* is performed (step P3).

If it is determined that reference and update processing for control authority is not performed (step P3, YES), the RPC gateway 10 initiates the following control authority reference processing (step P4).

First, the RPC gateway 10 determines whether or not the application 20*a* has a control authority with respect to the controlled devices 30 (30*a*, 30*b*, 30*c*) designated by the RPC execution request signal (step P5).

If it is determined that the application 20*a* has a control authority with respect to the designated controlled devices 30 (30*a*, 30*b*, 30*c*) (step P5, YES), the RPC gateway 10 terminates the control authority reference processing initiated in step P4 (step P8), and by using the CPU 11 as a transferring means, transfers (relays) to the controlled devices 30 (30*a*, 30*b*, 30*c*) the RPC execution request signal from the application 20*a*, i.e., [function name] and [argument (including data)] described in this RPC execution request signal (step P9).

Thereafter, the RPC gateway 10 executes reception processing based on an RPC execution result from a controlled device 30 remotely controlled (step P10), and determines based on this reception processing whether or not the RPC execution result conforms to a correct format (step P11).

If the RPC execution result conforms to a correct format (step P11, YES), the RPC gateway 10 transmits the execution result of the controlled device 30 to the application 20*a* that is a requester (step P12), and shifts to (3) control authority release processing to be described later.

Meanwhile, in step P2, if the RPC execution request signal does not conform to a correct format (step P2, NO), the RPC gateway 10 shifts to the reception processing again (step P2→P1). If reference and request processing for the control authority management storage unit 13*i* is being performed when the RPC execution request signal is received (step P3, NO), the RPC gateway 10 waits until this reference and request processing is completed. If the application 20 does not have a control authority with respect to a controlled device 30 designated in the RPC execution request signal (step P5, NO), after completion of control authority reference processing in step P4, the RPC gateway 10 sends the application 20*a* that is a requester a response indicating that a remote control with the RPC execution request signal is not executable, and terminates the RPC execution request acceptance processing (step P6→P7→End).

If the RPC gateway 10 either does not receive an execution result of a controlled device 30 which is remotely controlled (step P10, NO), or receives it (step P10 YES) when the execution result of the controlled device 30 fails to conform to a correct format (step P11, NO), the RPC gateway 10 sends the application 20a that is a requester a response indicating that remote control with the RPC execution request signal is not executable, and terminates the RPC execution request acceptance processing (step P7→End).

(3) Control Authority Release Acceptance Processing

As shown in FIG. 5C, if the RPC gateway 10 receives, from the application 20a that received an execution result, a control authority release request signal requesting for release (cancelation) of the controlled devices 30 (30a, 30b, 30c) that the application 20a has remotely controlled (step Q1, YES), the RPC gateway 10 confirms whether or not a format of the control authority release request signal from the application 20a that is a requester is correct (step Q2). If the format is correct (step Q2, YES), the RPC gateway 10 confirms whether or not the processing for rewriting (reference and update processing in FIG. 5C) the control authority management storage unit 13i is performed (step Q4).

If it is determined that the reference and update processing is not performed (step Q4, YES), the RPC gateway 10 initiates the following control authority update processing based on a control authority release request signal from the application 20a (step Q5).

That is, the RPC gateway 10 deletes from the control authority management storage unit 13i information on the application 20a that is a requester provided with a control authority with respect to the controlled devices 30 (30a, 30b, 30c) (step Q6), and sends the application 20a that is a requester and has transmitted a control authority release request signal a response indicating that a control authority has been released (step Q7). Thereafter, the RPC gateway 10 terminates the control authority update processing (step Q8).

If not receiving a control authority release request signal, the RPC gateway 10 waits until receipt of it (step Q1, NO). If the control authority release request signal does not conform to a correct format (step Q2, NO), the RPC gateway 10 sends the application 20a that is a requester a result indicating that a control authority cannot be released (step Q3) due to the incorrect format. If the reference and request processing for the control authority management storage unit 13i is being performed when the control authority request signal is received (step Q4, NO), the RPC gateway 10 waits until this reference and request processing is completed.

Therefore, according to the RPC gateway 10 with the configuration described above, the plurality of applications 20 (20a to 20c) and the plurality of controlled devices (30a to 30e) are connected to the RPC gateway 10, and the RPC gateway 10 includes the device identifier correlation information storage unit 13h in which the controlled devices 30 and identifiers respectively corresponding thereto are stored in such a manner that controlled devices 30 are respectively correlated with the identifiers, and the control authority management storage unit 13i in which a control authority with respect to the controlled devices 30 (30a to 30e) is stored for each application 20 (20a to 20c). For example, if no application 20 possesses a control authority with respect to all controlled devices 30 (30a, 30b, and 30c) designated as a remote control object by the application 20a (see the left side of FIG. 4B), in accordance with an RPC application signal from the application 20a, the RPC gateway 10 provides the application 20a with a control authority to remotely control operation of the controlled devices 30 (30a, 30b, 30c), and excludes a control authority for the other applications 20 (20b, 20c) to control these controlled devices 30 (30a, 30b, 30c) (forbids provision of a control authority) (that is, blocks a request for obtaining a control authority with respect to the controlled devices 30 (30a, 30b, 30c) from the other applications 20 (20b, 20c)). In this state, the RPC gateway 10 transmits, to the plurality of controlled devices 30 (30a, 30b, 30c) set to a remote control object an RPC execution request, a signal from the application 20a.

In this manner, the RPC gateway 10 provides the application 20a with an exclusive control authority with respect to the controlled devices 30 (30a, 30b, 30c) on a group-by-group basis, and excludes a control authority for the other applications 20 (20b, 20c) to control the controlled devices 30 (30a, 30b, 30c), so that the controlled devices 30 (30a, 30b, 30c) can be prevented from simultaneously or continuously receiving a plurality of RPC execution request signals. As a result, the entire processing can be achieved by: causing the controlled devices 30 (30a, 30b, 30c) to execute a series of processing operations with an RPC execution request from, e.g., the application 20a; releasing a control authority; and then causing the controlled devices 30 (30a, 30b, 30c) to execute another series of processing operations with an RPC application signal and an RPC execution request signal from, e.g., the application 20b. This prevents a malfunction such as a conflict between operations.

According to the RPC gateway 10 with the configuration described above, the RPC gateway 10 determines based on the control authority management storage unit 13i whether or not a control authority with respect to a controlled device 30 included in an RPC application signal received from an application 20 has been possessed.

Accordingly, if an application 20 that has transmitted the RPC execution request signal does not have a control authority with respect to the controlled device 30 designated by the application 20 itself, the RPC gateway 10 can determine that this access is an unauthorized access, thereby blocking the access from this application 20.

According to the RPC gateway 10 with the configuration described above, furthermore, the RPC gateway 10 confirms whether or not a format of an RPC application signal from an application 20 matches before the control authority update processing in step S4 is initiated.

Accordingly, if a format of the RPC application signal from the application 20 does not match, the RPC gateway 10 can determine that this access is an unauthorized access, thereby blocking the access from this application 20.

[Update Processing (1), Update Processing (2)/Controlled Device List Provision Processing, Real-time Controlled Device List Provision Processing]

Hereinafter, the description will be continued with reference to FIGS. 6A, 6B, 7A, and 7B.

The RPC gateway 10 includes a function of updating information stored in the device identifier correlation information storage unit 13h and the control authority management storage unit 13i based on the applications 20 and the controlled devices 30 connected to the RPC gateway 10. With this updating function, the RPC gateway 10 includes a function of outputting a list of the controlled devices 30 for which no application 20 possesses a control authority, using the CPU 11 as a list outputting means. By using the CPU 11 as a list outputting means, the RPC gateway 10 includes a function of outputting, as a result of the above-described control authority request acceptance processing, a list of the controlled devices 30 having their control authority being currently possessed, for each application 20.

FIG. 6A is a flowchart showing the update processing (1) of the RPC gateway 10 in the case where a new application 20 which differs from the applications 20 (20a to 20c) is connected to the application connection unit 14, and an application 20 is removed from all the applications 20 including this newly connected application 20. In this flowchart, an application 20 to be newly connected and an application 20 to be removed assume both a single application 20 and a plurality of applications 20. In FIG. 6B described below also, a controlled device 30 to be newly connected and a controlled device 30 to be removed assume both a single controlled device 30 and a plurality of controlled devices 30.

FIG. 6B is a flowchart showing the update processing (2) of the RPC gateway 10 in the case where a new controlled device 30 which differs from the controlled devices 30 (30a to 30e) is connected to the controlled device connection unit 15, and a controlled device 30 is removed from all the controlled devices 30 including this newly-connected controlled device 30.

When the RPC gateway 10 is driven to activate an update processing program 13b, the RPC gateway 10 determines whether or not a new application 20 has been connected to the application connection unit 14 (step T1).

If it is determined that a new application 20 has been connected (step T1, YES), the RPC gateway 10 adds and stores the new application 20 in the control authority management storage unit 13i (step T2).

Thereafter, the RPC gateway 10 determines whether or not any application 20 is removed from the RPC gateway 10 (step T3). In step T1, even if it is determined that no new application 20 has been connected (step T1, NO), the processing shifts to the operation in step T3 (step T1, (NO)→step T3).

If it is determined that an application 20 has been removed from the RPC gateway 10 (step T3, YES), the RPC gateway 10 removes information on this removed application 20 from the control authority management storage unit 13i (step T4).

In this manner, the information in the control authority management storage unit 13i remains updated at all times.

Next, the update processing (2) of the RPC gateway 10 will be described with reference to FIG. 6B.

The RPC gateway 10 determines whether or not a new controlled device 30 has been connected to the controlled device connection unit 15 (step T10).

If it is determined that a new controlled device 30 has been connected (step T10, YES), first, the RPC gateway 10 adds and stores, in the device identifier correlation information storage unit 13h, the new controlled device 30 and its corresponding identifier (step T11). The RPC gateway 10 then adds and stores, in the control authority management storage unit 13i, an identifier of the newly-added controlled device 30 (step T12).

Thereafter, the RPC gateway 10 determines whether or not any of the controlled devices 30 has been removed from the RPC gateway 10 (step T13). In step T10, even if it is determined that no new controlled device 30 has been connected (step T10, NO), the processing shifts to the operation in step T13 (step T10, (NO)→step T13).

If it is determined that a controlled device 30 has been removed (step T13, YES), the RPC gateway 10 deletes information on this removed controlled device 30 from the device identifier correlation information storage unit 13h and removes the information on this controlled device 30 removed from the device identifier correlation information storage unit 13i (step T14).

By executing this update processing (2), not only the device identifier correlation information storage unit 13h but also the control authority management storage unit 13i can remain updated.

The update processing (1) and the update processing (2) may be executed at any time while the RPC gateway 10 is driven. The update processing (1) and the update processing (2) may be executed when an application 20 and/or a controlled device 30 is connected or removed, or may be executed in response to a request for grasping a connection state of the controlled devices 30 and a control authority possessing state in real time, which will be described below with reference to FIGS. 7A and 7B.

Next, the controlled device list provision processing for the RPC gateway 10 will be described with reference to FIG. 7A.

Figure 7A:
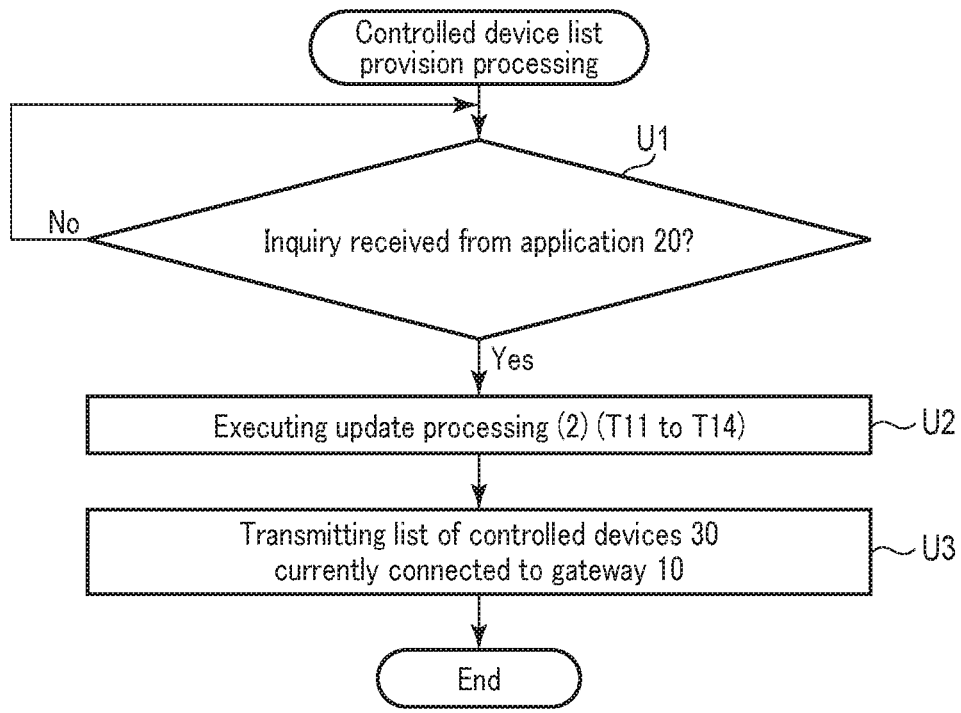
FIG. 7A is a flowchart showing a controlled device list provision processing through use of the update processing (2) of the RPC gateway 10.

FIG. 7A is a flowchart showing the operation of the RPC gateway 10 which executes the controlled device list provision processing using the update processing (2).

By driving the RPC gateway 10, a controlled device list provision processing program 13c is activated. Upon receipt of an inquiry for requesting information on a controlled device 30 for which a control authority is available (hereinafter, referred to as a "control authority confirmation signal") from the application 20 (step U1, YES), the RPC gateway 10 executes the update processing (2).

Specifically, in order to obtain the latest state of the controlled devices 30 connected to the RPC gateway 10, the operation from steps T11 to T14 is executed, thereby executing addition/removal of information on the controlled devices 30 within the device identifier correlation information storage unit 13h (step U2).

Thereafter, by using the CPU 11 as a list outputting means, the RPC gateway 10 transmits, to the application 20 from which the control authority confirmation signal is received, information on an identifier and its corresponding controlled device 30 stored in the device identifier correlation information storage unit 13h and information (list) of controlled devices 30 for which any application 20 can obtain a control authority, stored in the control authority management storage unit 13i (step U3).

Next, the real-time controlled device list provision processing for the RPC gateway 10 will be described with reference to FIG. 7B.

Figure 7B:
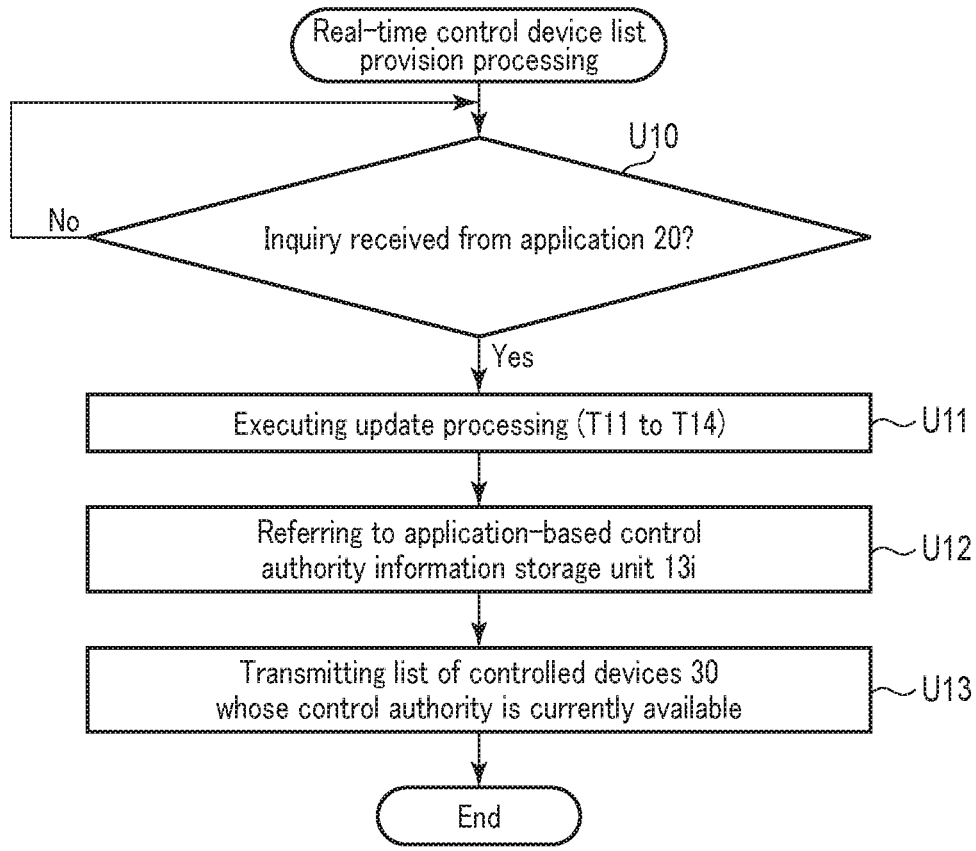
FIG. 7B is a flowchart showing a real-time controlled device provision processing through use of the update processing (2) of the RPC gateway 10.

FIG. 7B is a flowchart showing the operation of the RPC gateway 10 which executes the real-time controlled device list provision processing through use of the update processing (2).

By driving the RPC gateway 10, a real-time controlled device list provision program 13d is activated. Upon receipt of an inquiry for requesting information on a controlled device 30 having its control authority currently possessed (hereinafter, referred to as a "control authority obtention signal") (step U10, YES), the RPC gateway 10 executes the update processing (2) in a similar manner (step U11).

Thereafter, the RPC gateway 10 refers to the control authority management storage unit 13i in order to provide information on a controlled device 30 having its control authority currently possessed (step U12). Subsequently, by the CPU 11 as a list outputting means, the RPC gateway 10 transmits to an application 20, from which the control authority obtention signal is received, information of a list of controlled devices 30 having their control authority currently possessed, based on the information stored in the control authority management storage unit 13i (step U13).

Therefore, according to the RPC gateway 10 with the configuration described above, the RPC gateway 10 executes the update processing (2), and not only provides, by referring to the control authority management storage unit 12i, a list of controlled devices 30 having their control authority currently possessed by none of the applications 20, among controlled devices 30 currently connected to the RPC gateway 10, but also provides in real time a list of controlled devices 30 having their control authority currently possessed.

Accordingly, a user who operates the application 20 can perceive in real time a list of controlled devices 30 which are currently connected to the RPC gateway 10 and whose control authority is available, and whether or not the controlled devices 30 are currently controllable, that is, control authority for which controlled device 30 the application 20 has. [New Function Information Registration Notification Processing/Function Information Matching Confirmation Processing and Result Confirmation Processing]

Hereinafter, the description will be continued with reference to FIGS. 8, 9, and 10.

Figure 8:
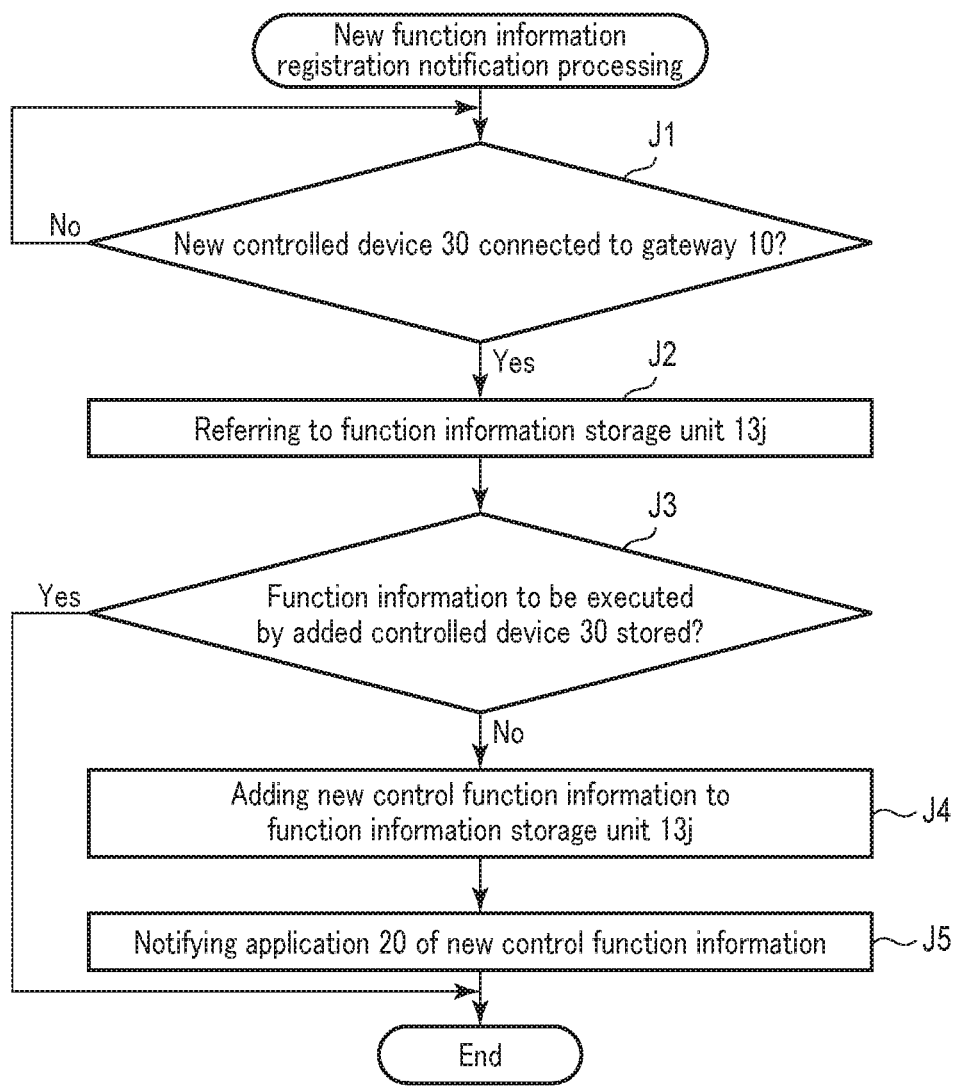
FIG. 8 is a flowchart showing new function information registration notification processing for the RPC gateway 10.

FIG. 8 is a flowchart showing new function information registration notification processing for the RPC gateway.

By driving the RPC gateway 10, new function information registration notification processing program 13e is activated. The RPC gateway 10 then activates the new function information registration notification processing program 13e, thereby executing the processing shown in FIG. 8, which will be described below.

First, the RPC gateway 10 determines whether a new controlled device 30 has been connected to the controlled device connection unit 15 (step J1). If there is no such connection (step J1, NO), the RPC gateway 10 waits until a new controlled device 30 is connected.

If it is determined that a new controlled device 30 is connected (step J1, YES), the RPC gateway 10 refers to the function information storage unit 13j (step J2) and confirms whether or not function information executable by the newly-connected controlled device 30 is already stored (registered) in the function information storage unit 13j (step J3).

If step J3 results in the determination that function information executable by the newly-connected controlled device 30 is not stored (registered) in the function information storage unit 13j (step J3, NO), the RPC gateway 10 stores (registers) this new function information in the function information storage unit 13j (step J4), and notifies all the applications 20 currently connected to the RPC gateway 10 that the new function information has been stored (registered) in the function information storage unit 13j (step J5).

As a result of J3, if function information executable by the newly-connected controlled device 30 is stored (registered) in the function information storage unit 13j (step J3, YES), the RPC gateway 10 terminates the processing.

In this manner, processing (P2-1) described below is executable instead of the format confirmation processing in step P2 described above.

Figure 9:
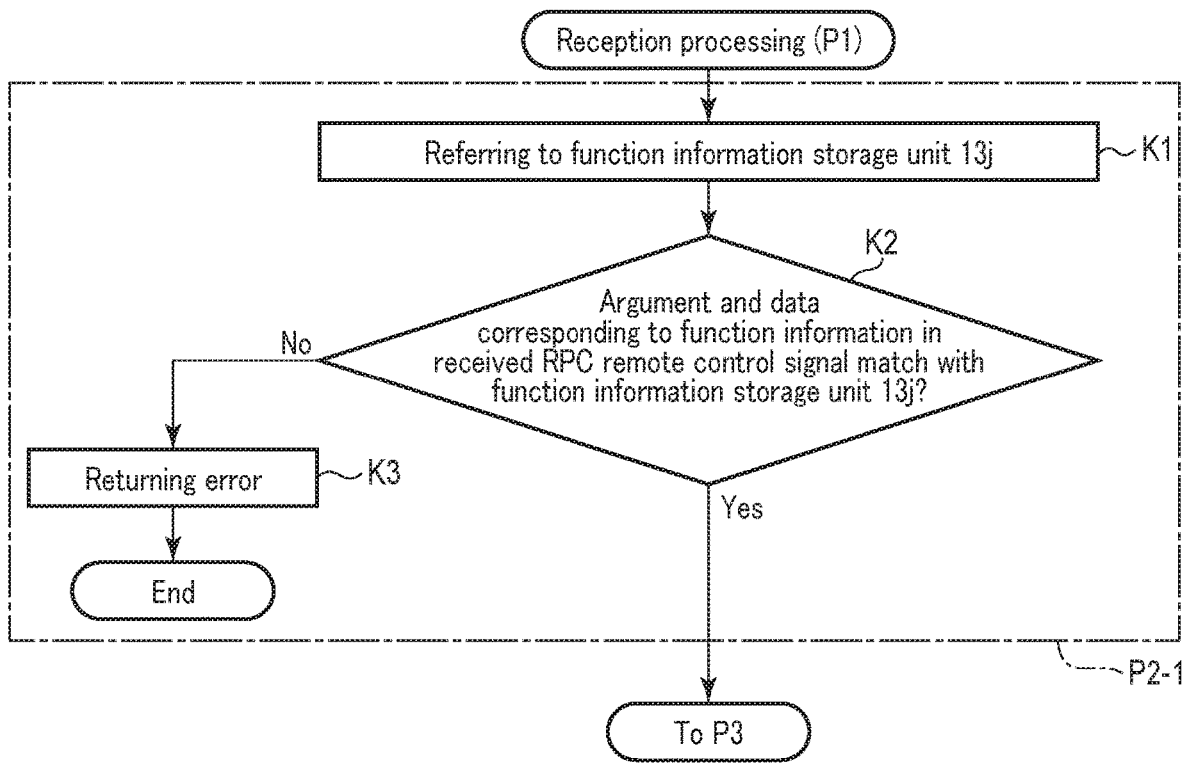
FIG. 9 is a flowchart showing function information matching confirmation processing for the RPC gateway 10.

FIG. 9 is a flowchart showing the function information matching confirmation processing (P2-1) which the RPC gateway 10 executes instead of the format confirmation processing (step P2).

The function information matching confirmation processing is processing for conforming whether or not function information (function name, argument [including data]) described in an RPC execution request signal transmitted by the application 20a contains no error, and matches with function information (function name, argument [including data]) stored in the function information storage unit 13j, that is, whether or not a format of the RPC execution request signal corresponds to a controlled device 30 that is a control object.

First, after receiving an RPC execution request signal from the application 20a in step P1, the RPC gateway 10 executes the processing for referring to the function information storage unit 13j based on function information in the RPC execution request signal (step K1).

By using the CPU 11 as a function information determining means, the RPC gateway 10 determines whether or not the function information (function name, argument [including data]) contained in the RPC execution request signal from the application 20 corresponds to part (function name, argument [including data]) of contents stored in the function information storage unit 13j (step K2).

If they match (step K2, YES), the RPC gateway 10 shifts to the processing in step P3, thereby determining whether or not processing for rewriting (reference and update processing in the drawings) the control authority management storage unit 13i is performed.

If the function information (function name, argument [including data]) contained in the RPC remote control signal does not match with the contents stored in the function information storage unit 13j (step K2, NO), the RPC gateway 10 returns an error to the application 20a (step K3), thereby terminating the processing.

As will be described below, the RPC gateway 10 can additionally execute the process of checking whether or not an execution result of a controlled device 30 contains an error, by using the function information storage unit 13j obtained by the new function information registration notification processing (J1 to J5).

Figure 10:
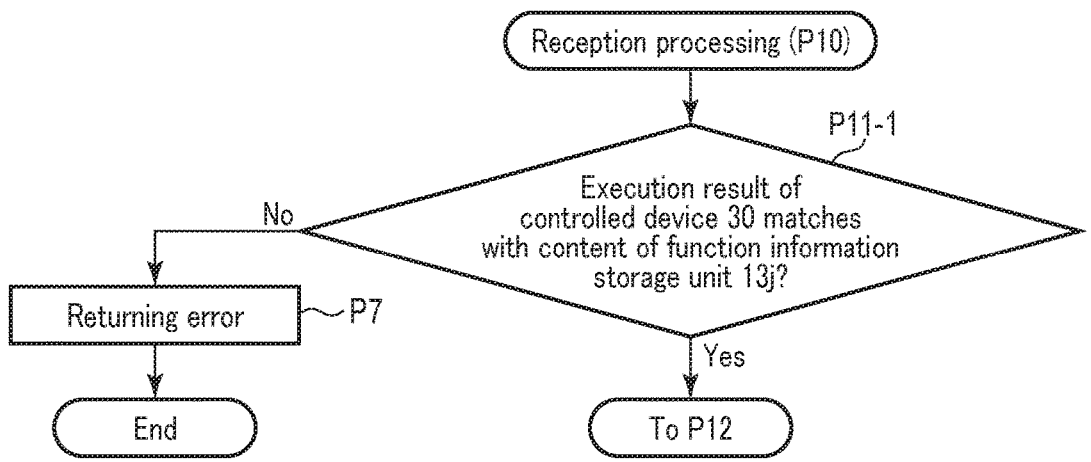
FIG. 10 is a flowchart showing format confirmation processing for the RPC gateway 10.

FIG. 10 is a flowchart showing format confirmation processing (P11-1) which the RPC gateway 10 executes instead of step P11 described above.

First, the confirmation processing program 13f is activated by driving the RPC gateway 10. In step 10, in the case of receiving an execution result obtained from a controlled device 30 remotely controlled (step P10, YES), the RPC gateway 10 confirms by using the CPU 11 as a control result determination means, whether or not the execution result matches with information (a data type of an execution result of the controlled device to be received) stored in the function information storage unit 13j (step P11-1). Specifically, the RPC gateway 10 confirms, for example, whether or not a content of the execution result is any of "True", "False", and a data string, whether or not the content is other than a character string, and so on.

If a content of an execution result is any of "True", "False", or a data string, it is determined that the execution result matches with the information.

If a content of an execution result matches with information stored in the function information storage unit 13j (P11-1, YES), the RPC gateway 10 shifts to step P12, thereby forwarding the execution result from the controlled device 30 to an application 20 that performed remote control.

In contrast, if a content of an execution result does not match with information stored in the function information storage unit 13j (P11-1, NO), the RPC gateway 10 returns an error to the application 20a, thereby terminating the processing (P7).

Accordingly, the RPC gateway 10 with the configuration described above includes the function information storage unit 13j configured to store function information (function name, argument [including data], a data type of an execution result of the controlled device 30 to be received) necessary to control operation of a controlled device 30. If a new controlled device 30 is added to the RPC gateway 10, and this newly-added controlled device 30 operates with a new function that differs from that of controlled devices 30 that have been connected already, this new function is added and stored in the function information storage unit 13j. The presence of this new function added and stored in the function information storage unit 13*j* is notified to the applications 20.

In this manner, only by newly connecting a controlled device 30 to the controlled device connection unit 15 of the RPC gateway 10 can the new controlled device 30 that operates with a new function be easily controlled.

In addition, the RPC gateway 10 with the configuration described above confirms whether or not a content of an RPC remote control signal from an application 20 and a result of a controlled device 30 match with contents stored in the function information storage unit 13*j*.

If function information executable by a newly-connected controlled device 30 does not match with contents stored in the function information storage unit 13*j*, the RPC gateway 10 thus configured can detect a bug occurring in the application 20, the controlled device 30 being in a previous version, and so on.

[Log Storage Processing]

Figure 11:
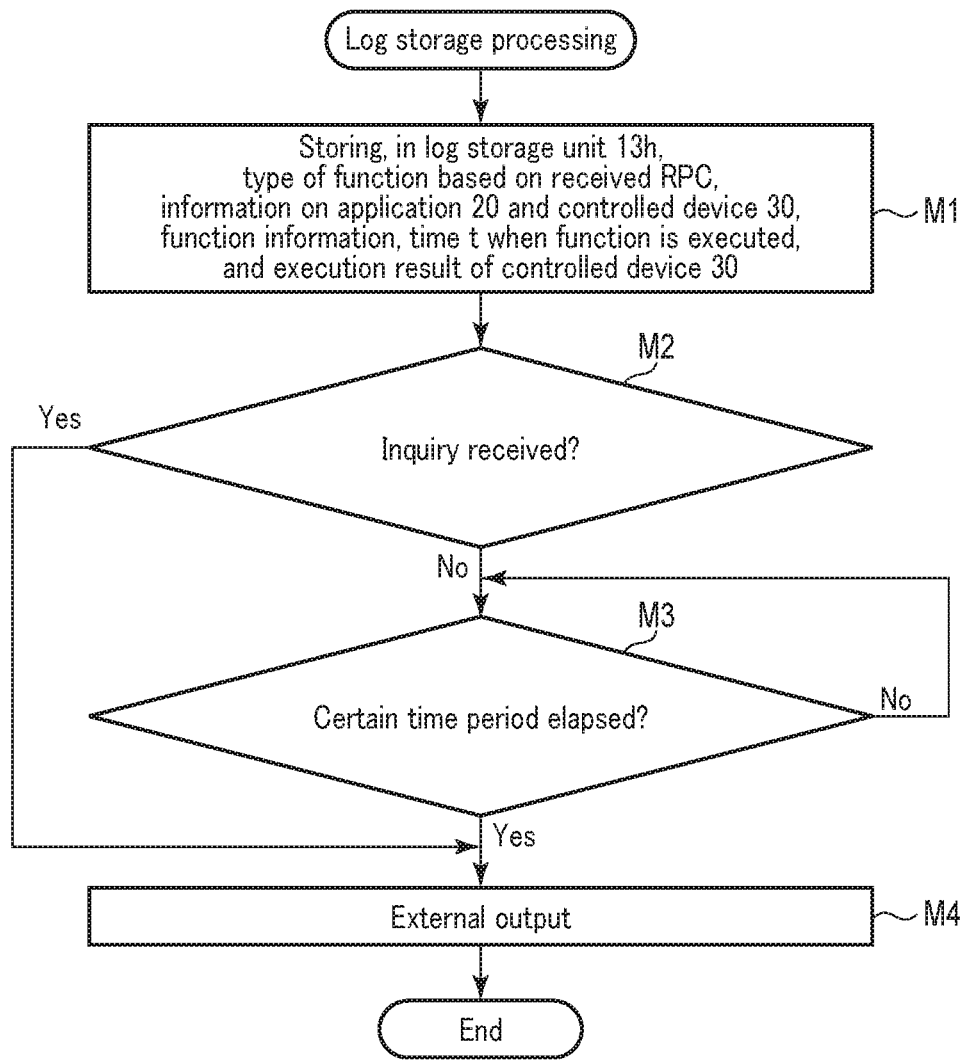
FIG. 11 is a flowchart showing log storage processing for the RPC gateway 10.

Next, the description will be continued with reference to FIG. 11. FIG. 11 is a flowchart showing log storage processing for the RPC gateway 10.

The log storage processing described below is a performed while the device control processing (steps S1 to S11) is executed, and a content obtained by performing the log storage processing is constantly stored in the log storage unit 13*k*.

That is, the log storage processing causes the log storage unit 13*k* to store an application 20 that has output a request signal, function information for remotely controlling a controlled device 30, an execution result, etc.

The log storage processing program 13*g* is activated by driving the RPC gateway 10. The RPC gateway 10 then stores in the log storage unit 13*k*, based on an RPC remote control signal received from an application 20 in step S1 "information on an application 20 that has transmitted this RPC remote control signal", "information on a controlled device 30 as a control object", "function information presented to a controlled device 30", "information on time when the controlled device 30 performs the aforementioned function", "information on a result obtained by performing the function", etc. (step M1).

Thereafter, upon receipt of a request for provision of log information stored in the log storage unit 13*k* from an application 20 (step M2, YES), the RPC gateway 10 outputs to this application 20 log information stored and accumulated in the log storage unit 13*k* (step M4).

Furthermore, even if there is no request for provision of log information from an application 20 (step M2, NO), after the expiration of certain time T, the RPC gateway 10 outputs to the application 20 log information stored and accumulated in the log storage unit 13*k* (step M4).

Through the RPC gateway 10 configured as described above executing the log storage processing constantly, the log storage unit 13*k* stores "information on an application 20 that has transmitted an RPC remote control signal", "information on a controlled device 30 as a control object", "function information based on which a controlled device 30 is instructed", "information on time when the controlled device 30 performs the aforementioned function", "information on an result obtained by performing the function", etc.

In this manner, even if as a result of a remote control, an error is returned from a controlled device 30 that is a control object, this error serves as effective evidence to clarify the application 20 which gave an instruction, with what function the error has caused, and so on when malfunction occurs in the device control system 1.

Generally in the device control system 1, the applications 20 are connected to the RPC gateway 10 using an HTTP (Hyper Text Transfer Protocol). In such a case, for example, the applications 20 are connected to the RPC gateway 10 via an API (Application Programming Interface).

In contrast, for example, the controlled devices 30 may be connected to the RPC gateway 10 using, e.g., an MQTT (MQ Telemetry Transport), too.

As described above, the RPC gateway 10 uses different communication protocols for the applications 20 and the controlled devices 30. Thus, the RPC gateway 10 itself may include a program (hereinafter, referred to as a "protocol conversion function program") that has a protocol conversion function.

In this case, the protocol conversion function program is stored in the storage device 13.

In the case of connection using the MQTT, the RPC gateway 10 cannot grasp, regarding a result of a controlled device 30, which application 20 remotely controls this controlled device 30. Therefore, the controlled device 30 is required to transmit not only a result but also an identifier of an application 20 (20*a* to 20*c*) as a transmission destination, etc.

Furthermore, a format of an RPC remote control signal which the RPC gateway 10 receives from an application 20 and relays for transmission to a controlled device 30 may take, for example, a configuration described in that JSON (JavaScriptObject Notation) (registered trademark) format or may be a program file, a configuration file, or binary data.

In such a case, a program file, a configuration file, or binary data transmitted from an application 20 may differ for each controlled device 30.

Furthermore, for example, if a controlled device 30 includes a camera function, the RPC gateway 10 may be configured to transmit to an application 20 a camera image or video from the controlled device 30.

An apparatus of the present invention may be realized by a computer and program. This program may be stored in a recording medium (or storage medium) or may be provided via a network.

Each unit described above and parts of these units may be implemented by a hardware configuration or a combination configuration of hardware resources and software. Examples of software in a combination configuration include a program which is installed in advance from a network or a computer readable recording medium (or a storage medium) into a computer so that the program is executed by a processor of the computer to cause the computer to perform each function of units.

The present invention is not limited to the embodiments described above, and may be variously modified without departing from the spirit of the invention when it is carried out. Furthermore, the embodiments described above include inventions at various stages, and various inventions may be extracted by appropriate combinations of disclosed structural elements. For example, even if some structural elements are deleted from the structural elements disclosed in the embodiments or some structural elements may be combined in a different form, the objects stated in Technical Problem can be addressed. If the effects stated in Advantageous Effects of Invention are attained, a configuration in which the structural elements are deleted or combined may be extracted as an invention.

(Appendix)

Part or all of the embodiments described above may be described as in the following in addition to the claims without being limited thereto.

[C1]

A device control apparatus (10) comprising:

an application-based control authority information storage unit (13) configured to store application-based control authority information that a plurality of applications configured to remotely control operation of a plurality of controlled devices (30) on a group-by-group basis are correlated with whether or not the applications possess control authority for remote control with respect to each controlled device (3);

a control authority determining means (11) configured to, upon receipt, from a first application included in the applications, of a request signal for requesting control authority with respect to the controlled devices (30), determine, based on the application-based control authority information, whether or not any application other than the first application has obtained control authority for remote control with respect to each controlled device;

a control authority providing means (11) configured to provide the first application with control authority with respect to the controlled devices if the control authority determining means (11) determines that no application other than the first application has obtained control authority for remote control with respect to each controlled device;

a control authority forbidding means (11) configured to forbid provision of control authority with respect to the controlled devices to the applications other than the first application if the control authority providing means provides the first application with the control authority; and a transferring means (11) configured to, if a remote control signal directed to the controlled devices is transmitted from the first application provided with the control authority, transfer the remote control signal to the controlled devices.

[C2]

The device control apparatus according to [C1], further comprising an error processing means (11) configured to perform error processing if any application other than the first application obtains control authority with respect to the controlled devices designated by the first application, and as a result, the control authority determining means (11) determines that the first application cannot obtain control authority for remote control with respect to the designated controlled devices.

[C3]

The device control apparatus according to [C1] or [C2], further comprising a controlled device information storage unit (13) configured to store connection information of the controlled devices, wherein the control authority determining means (11) comprises:

a connection confirming means (11) configured to confirm based on the connection information of the controlled devices stored in the memory, that the controlled devices for which control authority has been requested by the request signal from the first application are connected; and an authorization determining means (11) configured to determine whether or not control authority with respect to the controlled devices requested by the request signal from the first application has been provided to any application other than the first application, wherein the device control apparatus provides the first application with control authority with respect to the controlled devices if the connection confirming means (11) confirms connection of the controlled devices and it is determined that no application other than the first application is provided with control authority with respect to the controlled devices requested by the request signal.

[C4]

The device control apparatus according to any of [C1] to [C3], further comprising a first list outputting means (11) configured to output, for each application, a list of controlled devices for which control authority are available, wherein the first list outputting means comprising:

a means for receiving, if the first list request signal is transmitted by at least one application, a first list request signal for requesting output of a list of the controlled devices for which the "at least one application" can obtain the control authority; and a list outputting means for outputting to an application as a transmission source of the first list request signal, if the first list request signal is received, a list of the controlled devices for which the control authority has not been obtained based on the application-based control authority information stored in the application-based control authority information storage unit (13).

[C5]

The device control apparatus according to any of [C1] to [C3], further comprising a second list outputting means configured to output for each application a list of controlled devices for which control authority are currently possessed, wherein the second list outputting means comprises:

a means for receiving, if the second list request signal is transmitted from at least one application, a second list request signal for requesting output of a list of the controlled devices for which the "at least one application" has obtained the control authority; and a means for outputting, based on information stored in the memory and upon receipt of the second list request signal, a list of the controlled devices for which an application as a transmission source of the second list request signal currently possesses control authority.

[C6]

The device control apparatus according to any of [C1] to [C5], further comprising:

a function information storage unit (13) configured to store a function that is executable with each controlled device being a remote control object, an argument necessary for the function, and a data type of a result of execution of remote control using the function;

a function information determining means configured to determine, if the remote control signal includes a function and an argument necessary for the function, whether or not the function and the argument match with a content stored in the memory; and a control result determining means configured to determine whether or not a data type of the result obtained by executing remote control over the controlled devices based on the remote control signal matches with the data type stored in the memory.

[C7]

A device control method that is executed by a device control apparatus (10) including a controller (11), comprising:

storing, by the controller (11), application-based control authority information that a plurality of applications configured to remotely control operation of a plurality of controlled devices on a group-by-group basis are correlated with whether or not the applications possess control authority for remote control with respect to each controlled device;

upon receipt, from a first application included in the applications, of a request signal for requesting control authority with respect to the controlled devices, determining by the controller (11), based on the application-based control authority information whether or not any application other than the first application has obtained control authority for remote control with respect to each controlled device;

providing, via the controller (11), the first application with control authority with respect to the controlled devices if it is determined that no application other than the first application has obtained control authority for remote control with respect to each controlled device;

forbidding, by the controller (11), provision of control authority with respect to the controlled devices to the applications other than the first application if the first application is provided with the control authority; and if a remote control signal directed to the controlled devices is transmitted from the first application provided with the control authority, transferring, via the controller (11), the remote control signal to each controlled device.

[C8]

A device control system (1) comprising a device control apparatus (10) configured to relay a remote control signal to a plurality of controlled devices as a remote control object, the remote control signal being from at least one device capable of executing a plurality of applications configured to remotely control operation of the controlled devices on a group-by-group basis, wherein each application comprises:

a requesting means configured to make a request for obtaining control authority with respect to the controlled devices; and a transmitting means configured to transmit, if control authority with respect to the controlled devices is obtained by the requesting means, a remote control signal for remotely controlling the controlled devices, wherein the device control apparatus (10) comprises:

an application-based control authority information storage unit (13) configured to store application-based control authority information that the applications are each correlated with whether or not the applications possess control authority for remote control with respect to each controlled device;

a control authority determining means (11) configured to determine based on the application-based control authority information, upon receipt from a first application included in the applications, a request signal for requesting control authority with respect to the controlled devices, whether or not any application other than the first application has obtained control authority for remote control with respect to each controlled device;

a control authority providing means (11) configured to provide the first application with control authority with respect to the controlled devices if the control authority determining means determines that no application other than the first application has obtained control authority for remote control with respect to each controlled device;

a control authority forbidding means (11) configured to forbid provision of control authority with respect to the controlled devices to the applications other than the first application if the first application is provided with the control authority; and a transferring means (11) configured to transfer, if a remote control signal directed to the controlled devices is transmitted from the first application provided with the control authority, the remote control signal to each controlled device, wherein the controlled devices (30) operate based on the remote control signal received from the device control apparatus.

[C9]

A program for causing a computer to execute processing by each means of the apparatus according to any of [C1] to [C6].

REFERENCE SIGNS LIST

1 . . . device control system, 10 . . . RPC gateway, 11 . . . CPU, 12 . . . memory,
12*a* . . . working area, 13 . . . storage device, 13*a* . . . device control processing program,
13*b* . . . update processing program, 13*c* . . . controlled device list provision program,
13*d* . . . real-time controlled device list provision program,
13*e* . . . new function information registration notification processing program, 13*f* . . . confirmation processing program,
13*g* . . . log storage processing program, 13*h* . . . device identifier correlation information storage unit,
13*i* . . . control authority management storage unit, 13*j* . . . function information storage unit,
13*k* . . . log storage unit, 14 . . . application connection unit,
15 . . . controlled device connection unit, 16 . . . system bus,
20, 20*a*-20*c* . . . application,
30, 30*a*-30*e* . . . controlled device

The invention claimed is:

1. A device control apparatus, comprising:

a processor; and a memory connected to the processor, wherein the processor is configured to:

cause the memory to store application-based control authority information that a plurality of applications configured to remotely control operation of a plurality of controlled devices on a group-by-group basis are correlated with whether or not each of the applications possesses control authority for remote control with respect to each of the controlled devices;

upon receipt from a first application included in the applications a request signal for requesting control authority with respect to the controlled devices, determine based on the application-based control authority information whether or not any of the applications other than the first application has obtained control authority for remote control with respect to each of the controlled devices;

provide the first application with control authority with respect to the controlled devices if it is determined that none of the applications other than the first application has obtained control authority for remote control with respect to any of the controlled devices, and provide the first application with no control authority with respect to the controlled devices if it is determined that any of the applications other than the first application has obtained control authority for remote control with respect to at least one of the controlled devices;

forbid provision of control authority with respect to the controlled devices to the applications other than the first application if the first application is provided with the control authority;

if a remote control signal directed to the controlled devices is transmitted from the first application provided with the control authority, transfer the remote control signal to each of the controlled devices;

if a remote control signal directed to a controlled device for which a respective one of the applications is not provided with control authority is transmitted from the respective one of the applications, refrain from transferring the remote control signal to the controlled device;

if a signal for requesting release of the control authority with respect to a controlled device possessed by the first application is received from the first application provided with the control authority, release the control authority of the first application with respect to the controlled device;

maintain control authority of the first application with respect to the controlled device until receipt of a signal for requesting release of the control authority from the first application, and if any of the applications other than the first application obtains control authority with respect to the controlled devices designated by the first application, and as a result, it is determined that the first application cannot obtain control authority for remote control with respect to the designated controlled devices, send the first application a response indicating that obtention of a control authority has failed.

2. The device control apparatus according to claim 1, wherein the processor is further configured to:

cause the memory to store connection information of the controlled devices;

confirm based on the connection information of the controlled devices stored in the memory, that the controlled devices for which control authority has been requested by the request signal from the first application are connected;

determine whether or not control authority with respect to the controlled devices requested by the request signal from the first application has been provided to any of the applications other than the first application; and provide the first application with control authority with respect to the controlled devices if connection of the controlled devices is confirmed and it is determined that none of the applications other than the first application is provided with control authority with respect to the controlled devices requested by the request signal.

3. The device control apparatus according to claim 1, wherein the processor is further configured to:

if at least one of the applications transmits a first list request signal for requesting output of a list of the controlled devices for which the at least one application can obtain the control authority, receive the first list request signal; and upon receipt of the first list request signal, output based on the application-based control authority information stored in the memory a list of the controlled devices for which the control authority has not been obtained to an application as a transmission source of the first list request signal.

4. The device control apparatus according to claim 1, wherein the processor is further configured to:

if at least one of the applications transmits a second list request signal for requesting output of a list of the controlled devices for which the at least one of the applications currently possesses the control authority, receive the second list request signal; and upon receipt of the second list request signal, output based on information stored in the memory a list of the controlled devices the control authority for which has been obtained and is currently possessed by an application as a transmission source of the second list request signal.

5. The device control apparatus according to claim 1, wherein the processor is further configured to:

cause the memory to store a function that is executable with each of the controlled devices being a remote control object, an argument necessary for the function, and a data type of a result of execution of remote control using the function;

if the remote control signal includes a function and an argument necessary for the function, determine whether or not the function and the argument match with a content stored in the memory; and determine whether or not a data type of the result obtained by executing remote control over the controlled devices based on the remote control signal matches with the data type stored in the memory.

6. A device control method that is executed by a device control apparatus including a processor and a memory connected to the processor, the method comprising:

causing, by the processor, the memory to store application-based control authority information that a plurality of applications configured to remotely control operation of a plurality of controlled devices on a group-by-group basis are correlated with whether or not each of the applications possesses control authority for remote control with respect to each of the controlled devices;

upon receipt from a first application included in the applications a request signal for requesting control authority with respect to the controlled devices, determining, by the processor, based on the application-based control authority information whether or not any of the applications other than the first application has obtained control authority for remote control with respect to each of the controlled devices;

providing, by the processor, the first application with control authority with respect to the controlled devices if it is determined that none of the applications other than the first application has obtained control authority for remote control with respect to any of the controlled devices, and providing the first application with no control authority with respect to the controlled devices if it is determined that any of the applications other than the first application has obtained control authority for remote control with respect to at least one of the controlled devices;

forbidding, by the processor, provision of control authority with respect to the controlled devices to the applications other than the first application if the first application is provided with the control authority; and if a remote control signal directed to the controlled devices is transmitted from the first application provided with the control authority, transferring, by the processor, the remote control signal to each of the controlled devices;

if a remote control signal directed to a controlled device for which a respective one of the applications is not provided with control authority is transmitted from the respective one of the applications, refraining, by the processor, from transferring the remote control signal to the controlled device;

maintaining, by the processor, control authority of the first application with respect to the controlled device until receipt of a signal for requesting release of the control authority from the first application, and if a signal for requesting release of the control authority with respect to a controlled device possessed by the first application is received from the first application provided with the control authority, releasing the control authority of the first application with respect to the controlled device, and if any of the applications other than the first application obtains control authority with respect to the controlled devices designated by the first application, and as a result, it is determined that the first application cannot obtain control authority for remote control with respect to the designated controlled devices, sending, by the processor, the first application a response indicating that obtention of a control authority has failed.

7. A non-transitory tangible computer-readable storage medium storing an instruction for causing a processor to:

cause a memory to store application-based control authority information that a plurality of applications configured to remotely control operation of a plurality of controlled devices on a group-by-group basis are correlated with whether or not each of the applications possesses control authority for remote control with respect to each of the controlled devices, the memory being connected to the processor;

upon receipt from a first application included in the applications a request signal for requesting control authority with respect to the controlled devices, determine based on the application-based control authority information whether or not any of the applications other than the first application has obtained control authority for remote control with respect to each of the controlled devices;

provide the first application with control authority with respect to the controlled devices if it is determined that none of the applications other than the first application has obtained control authority for remote control with respect to any of the controlled devices, and provide the first application with no control authority with respect to the controlled devices if it is determined that any of the applications other than the first application has obtained control authority for remote control with respect to at least one of the controlled devices;

forbid provision of control authority with respect to the controlled devices to the applications other than the first application if the first application is provided with the control authority;

if a remote control signal directed to the controlled devices is transmitted from the first application provided with the control authority, transfer the remote control signal to the controlled devices;

if a remote control signal directed to a controlled device for which a respective one of the applications is not provided with control authority is transmitted from the respective one of the applications, refrain from transferring the remote control signal to the controlled device;

if a signal for requesting release of the control authority with respect to a controlled device possessed by the first application is received from the first application provided with the control authority, release the control authority of the first application with respect to the controlled device;

maintain control authority of the first application with respect to the controlled device until receipt of a signal for requesting release of the control authority from the first application, and if any of the applications other than the first application obtains control authority with respect to the controlled devices designated by the first application, and as a result, it is determined that the first application cannot obtain control authority for remote control with respect to the designated controlled devices, send the first application a response indicating that obtention of a control authority has failed.

* * * * *